(12) United States Patent
Boker et al.

(10) Patent No.: US 9,030,486 B2
(45) Date of Patent: May 12, 2015

(54) SYSTEM AND METHOD FOR LOW BANDWIDTH IMAGE TRANSMISSION

(75) Inventors: Steven M. Boker, Charlottesville, VA (US); Timothy R. Brick, Charlottesville, VA (US); Jeffrey R. Spies, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1025 days.

(21) Appl. No.: 13/059,586

(22) PCT Filed: Aug. 21, 2009

(86) PCT No.: PCT/US2009/054651
§ 371 (c)(1),
(2), (4) Date: Mar. 30, 2011

(87) PCT Pub. No.: WO2010/022351
PCT Pub. Date: Feb. 25, 2010

(65) Prior Publication Data
US 2011/0292054 A1 Dec. 1, 2011

Related U.S. Application Data

(60) Provisional application No. 61/090,944, filed on Aug. 22, 2008, provisional application No. 61/235,549, filed on Aug. 20, 2009.

(51) Int. Cl.
| | |
|---|---|
| *G09G 5/00* | (2006.01) |
| *G06T 13/00* | (2011.01) |
| *G06K 9/46* | (2006.01) |
| *G06T 9/00* | (2006.01) |

(52) U.S. Cl.
CPC ...................... *G06T 9/001* (2013.01)

(58) Field of Classification Search
None
See application file for complete search history.

(56) References Cited

U.S. PATENT DOCUMENTS

| | | | |
|---|---|---|---|
| 6,272,231 B1 | 8/2001 | Maurer | |
| 6,549,200 B1 | 4/2003 | Mortlock | |
| 6,594,395 B1 | 7/2003 | Forchheimer | |
| 6,806,898 B1 * | 10/2004 | Toyama et al. | 348/14.16 |
| 6,876,364 B2 | 4/2005 | Buddemeier | |

(Continued)

OTHER PUBLICATIONS

Jing Xiao et al., Real-Time Combined 2D+3D Active Appearance Models, Jun., 2004, Proceedings of the IEEE Conference on Computer Vision and Pattern Recognition, pp. 535-542.*

(Continued)

*Primary Examiner* — Kee M Tung
*Assistant Examiner* — Frank Chen
(74) *Attorney, Agent, or Firm* — Robert J. Decker

(57) ABSTRACT

An image transmission method (and related system) for obtaining data of a local subject and processing the data of the local subject to fit a local model of at least a region of the local subject and extract parameters of the local model to capture features of the region of the local subject. The method (and related system) may also include obtaining data of at least one remote subject and processing the data of the remote subject to fit at least one of at least one region of the remote subject and extract parameters the remote model to capture features of the region of the remote subject. The method (and related system) may also include transmitting the extracted parameters of the local region to a remote processor and reconstructing the local image based on the extracted parameters of the local region and the extracted parameters of the remote region.

134 Claims, 6 Drawing Sheets

(56) References Cited

U.S. PATENT DOCUMENTS

| | | | |
|---|---|---|---|
| 7,027,618 B2 | 4/2006 | Trajkovic | |
| 7,050,655 B2 | 5/2006 | Ho | |
| 7,103,211 B1 | 9/2006 | Medioni | |
| 7,106,358 B2 | 9/2006 | Valliath | |
| 7,176,956 B2 | 2/2007 | Rzeszewski | |
| 7,650,015 B2 * | 1/2010 | Pirim | 382/103 |
| 7,885,455 B2 * | 2/2011 | Liu et al. | 382/160 |
| 7,916,971 B2 | 3/2011 | Bigioi | |
| 2007/0182812 A1 | 8/2007 | Ritchey | |
| 2008/0242954 A1 * | 10/2008 | Naya et al. | 600/300 |
| 2008/0279446 A1 | 11/2008 | Hassebrook | |

OTHER PUBLICATIONS

Akiyama, "Consideration on Three-Dimensional Visual Communication Systems," IEEE Journal on Selected Areas in Communications, May 1991, pp. 555-560, vol. 9, No. 4.

Baker, "Automatic Construction of Active Appearance Models as an Image Coding Problem," IEEE Transactions on Pattern Analysis and Machine Intelligence, Oct. 2004, pp. 1380-1384, vol. 26, No. 10.

Barfield, "Visualizing the Structure of Virtual Objects using Head Tracked Stereoscopic Displays," Proceedings of the 1997 Virtual Reality Annual International Symposium, 1997, pp. 114-120.

Bickel, "Multi-Scale Capture of Facial Geometry and Motion," ACM Transactions on Graphics, Jul. 2007, pp. 33-1—33-10, vol. 20, No. 3, Article 33.

Boker, Something in the Way We Move: Motion Dynamics, not Perceived Sex, Influence Head Movements in Conversation, * Journal of Experimental Psychology: Human Perception & Performance, Jun. 2011, pp. 874-891, vol. 37, No. 3.

Brick, "High-Presence, Low-Bandwidth, Apparent 3D Video-Conferencing with a Single Camera," WIAMIS '09, 10th International Workshop on Image Analysis for Multimedia Interactive Services, May 6-8, 2009, 4 pages.

Chen, "Toward a Compelling Sensation of Telepresence: Demonstrating a Portal to a Distant (Static) Office," Visualization '00 Proceedings of the 11th IEEE Visualization 2000 Conference (VIS 2000), 2000, pp. 327-333.

Cootes, "Active Appearance Models," IEEE Transactions on Pattern Analysis and Machine Intelligence, Jun. 2001, pp. 681-685, vol. 23, No. 6.

Cootes, "Deformable Object Modelling and Matching," The Tenth Asian Conference on Computer Vision (ACCV) 2010, Lecture Notes in Computer Science, 2011, vol. 6492, pp. 1-10.

Gao, "A Review of Active Appearance Models," IEEE Transactions on Systems, Man, and Cybernetics—Part C: Applications and Reviews, Mar. 2010, pp. 145-158, vol. 40, No. 2.

Lei, "Middle View Stereo Representation: An Efficient Architecture for Teleconference with Handling Occlusions," IEEE International Conference on Image Processing, 2001, pp. 915-918.

Matthews, "Active Appearance Models Revisited," International Journal of Computer Vision, Nov. 2004, pp. 135-164, vol. 60, Iss. 2.

News Staff, "Motion Parallax Brings 3-D Videoconferencing to Your Cell Phone," Scientific Blogging, Science 2.0 (http://www.science20.com/news_articles/motion_parallax_brings_3d_videoconferencing_your_cell_phone), May 10, 2009, 5 pages.

Nguyen, "Real-time 3D Human Capture System for Mixed-Reality Art and Entertainment," IEEE Transactions on Visualization and Computer Graphics, Nov./Dec. 2005, pp. 706-721, vol. 11, No. 6.

O'Conaill, "Conversations Over Video Conferences: An evaluation of the Spoken Aspects of Video-Mediated Communication," Human-Computer Interaction, 1993, pp.. 389-428, vol. 8, Iss. 4.

Prince, "3D live: Real Time Captured Content for Mixed Reality," Proceedings of the International Symposium on Mixed and Augmented Reality, 2002, 7 pages.

Rauthenberg, "The Virtual Meeting Room: A Realtime Implementation of a shared Virtual Environment System Using Today's Consumer Technology in Connection with the MPEG-4 Standard," Presence 2000: 3rd International Workshop on Presence, 2000, 6 pages.

Theobald, "Near-Videorealistic Synthetic Talking Faces: Implementation and Evaluation," Speech Communication 44, 2004, pp. 127-140.

Theobald, "Real-Time Expression Cloning using Appearance Models," International Conference on Multimodal Interaction (ICMI'07), Nov. 12-15, 2007, pp. 134-139.

Theobald, "Towards a Low Bandwidth Talking Head Using Appearance Models," Image and Vision Computing, 2003, pp. 1117-1124, vol. 21, Iss. 13.

Van Den Hengel, "VideoTrace: Rapid Interactive Scene Modelling from Video," ACM Transactions on Graphics, 2007, pp. 86-1—86-5, vol. 26, No. 3, Article 86.

Walker, "Automatically Building Appearance Models from Image Sequences using Salient Features," Image and Vision Computing, Apr. 15, 2002, pp. 435-440, vol. 20, Iss. 5-6.

Wang, "Enforcing Convexity for Improved Alignment with Constrained Local Models," IEEE International Conference on Computer Vision and Pattern Recognition (CVPR), Jun. 2008, 8 pages.

Yoshikawa, "A High Presence Shared Space Communication System Using 2D Background and 3D Avatar," Proceedings of the 2004 International Symposium on Applications and the Internet, 2004, 6 pages.

Zhang, "High-Resolution, Real-Time 3D Shape Acquisition," Proceedings of the 2004 IEEE Computer Society Conference on Computer Vision and Pattern Recognition Workshop, 2004, 10 pages.

* cited by examiner

SYSTEM AND METHOD FOR LOW BANDWIDTH IMAGE TRANSMISSION

RELATED APPLICATIONS

This application is a national stage filing of International Application No. PCT/US2009/054651, filed Aug. 21. 2009, which claims priority under 35 U.S.C. §119 (e) U.S. Provisional Application Ser. No. 61/090,944, filed Aug. 22, 2008, entitled "System, Computer Program Product and Method for Low Bandwidth Videoconferencing with Motion Parallax" and U.S. Provisional Application Ser. No. 61/235,549, filed Aug. 20, 2009, entitled "System, Computer Program Product and Method for Low Bandwidth Videoconferencing with Motion Parallax;" the disclosures of which are hereby incorporated by reference herein in their entirety.

BACKGROUND OF THE INVENTION

As small digital video cameras have become less costly and more ubiquitous, showing up on consumer products such as laptops, PDA's, and cellular phones, video-conferencing has seen increasingly wide-spread usage. In order to gain wide-spread acceptance, video-conferencing faces two major difficulties. First, high frame-rate transmissions have heavy bandwidth requirements, and average users are often constrained to low frame-rates and poor quality transmission, even with the use of video compression algorithms. Second, basic video-conferencing lacks a feeling of common presence and shared space, fundamentally changing the dynamics of conversation and potentially causing the participants to feel uncomfortable [9].

Small digital video cameras have become increasingly common. appearing on portable consumer devices such as laptops, PDAs, and cellular phones. The widespread use of video-conferencing, however, is limited in part by the lack of bandwidth available on such devices. Also, video-conferencing can produce feelings of discomfort in conversants due to a lack of co-presence. The graphics literature offers a wide range of technologies intended to increase the feeling of co-presence, but many of these techniques are not practical in the consumer market due to the costly and elaborate equipment required (such as stereoscopic displays and multi-camera arrays).

More advanced video-conferencing systems introduce co-presence by inducing the perception of three-dimensionality. This can be accomplished using binocular disparity technologies such as stereoscopic displays [1] or augmented reality systems. For example, Prince et al. [10] and Nguyen et al. [8] use head-mounted displays to create a three-dimensional experience of an object. An alternate approach, motion parallax, approximates a three-dimensional experience by rotating a 3D model of the object based on the user's viewing angle. This has been reported to provide a greater level of presence than the binocular approach [2], but current implementations require the use of expensive motion-tracking technologies such as multi-camera, optical tracking arrays [6] or magnetic motion-capture systems [4]. Regardless of the ultimate display technology, whether binocular or motion-based, generating an image of the object to be displayed requires at least a two-camera system.

BRIEF SUMMARY OF THE INVENTION

In response to the limitations of the conventional technology, an aspect of an embodiment of the present invention provides, but not limited thereto, a real-time, high frame-rate video-conferencing (or other applicable image transmission) system and related method that provides simulated three-dimensionality via motion parallax in order to achieve high co-presence. The system and related method may use Active Appearance Models (AAM) to track and re-synthesize each participant's face (or applicable region), so that only the (few tens of) parameters of the model need be transferred to the remote computer for each frame. This both provides motion-tracking for the simulated 3D experience and reduces the bandwidth requirements of the video-conference to the order of a few hundred bytes per frame.

Bandwidth and processor usage for the algorithms are reported; and possible implications and applications of this technology are also discussed and contemplated as aspects of an embodiment of the systems and method discussed herein.

An aspect of an embodiment of the present invention provides, but not limited thereto, a real-time, high frame-rate video-conferencing (or other applicable image transmission) system and related method that provides an experience of co-presence without the need for expensive displays, multi-camera arrays, or elaborate motion-capture equipment. For example, an embodiment of present invention system and method is capable of using a single, commodity camera and an Active Appearance Model—a statistical model of the face—to capture and display near-photorealistic video of each participant's face (or applicable region), while simultaneously tracking each participant's movement. The system's representation of each participant's appearance results in extremely low bandwidth usage. Tracking allows the use of motion parallax to create a three-dimensional experience.

While the various aspects of the various embodiments of the present invention system and method may be operated in real time, it should be appreciated that it's not necessary. For example, but not limited thereto, processing, operations and transmissions may occur in real time or not in real time. Moreover, for example but not limited thereto, processing, operations and transmissions may occur after being recorded with a TiVO or Digital Video Recorders (DVRs). That is to say that a digital storage device may record the transmitted parameters and process and recreate a context-dependent display upon later viewing.

An aspect of an embodiment of the present invention is a real-time, high frame-rate video-conferencing system (or other applicable image transmission) that creates a feeling a co-presence without the use of expensive motion-tracking technologies or multi-camera arrays. A sense of three-dimensionality is achieved via motion parallax with only one commodity camera, making the method and system particularly useful in small portable devices, for example. Although, it should be appreciated that multiple cameras (or other image acquisition means or image storage means) may be utilized if desired. Active Appearance Models (statistical representations of the face (or other region) or other select models) are utilized to track and recreate each participant's face (or other applicable region or object) so that only the model parameters need be transmitted for each frame. Because fewer parameters are sent across the system, considerably less bandwidth is used (only a few hundred bytes per frame, for example). This makes possible near-photorealistic video-conferencing for devices such as cell phones, PDAs and laptops. Because the system and method makes video communication (or other applicable image transmission) more comfortable and efficient, it can also help revolutionize the online gaming industry, animation technology, medical industry, marketing industry, sport and recreation telecasts, television, interact and intranet communication, and other media applications.

The motion parallax of an aspect of an embodiment of the present invention system and method provides a greater sense of personal connection between users than other approaches. An aspect of an embodiment of the present invention system and method provides the ability to create this effect without the need for expensive displays, multi-camera arrays or elaborate motion capture equipment, thereby providing the capability to make this technology available to anyone with a handheld communication device.

An aspect of an embodiment of the present invention system and method implements statistical representations of a person's face, for example, to track and reconstruct that face. This allows the principal components of facial expression—only dozens in number (for example)—to be transmitted as a close rendition of the actual face. It's a sort of connect-the-dots fabrication that can be transmitted frame by frame in near real-time, requiring considerably less bandwidth for transmission—only a few hundred bytes per frame—than the tens of thousands of bytes needed of conventional systems to transmit a full-face image.

An aspect of an embodiment of the present invention system and method provides, but not limited thereto, way to capture micro facial expressions while people communicate with each other eye-to-eye.

An aspect of an embodiment of the present invention system and method provides, but not limited thereto, the ability that would allow participants to look directly at each other, while also capturing, for example, the eyes or at least some portion of a region of the participants or subject. Moreover, it may be provided for capturing thousands of micro-expressions (or other information, characteristics, or features) made by participants or subjects. An aspect of an embodiment allows people to look at each other directly, rather than at a monitor off to the side. For instance, this "mirroring process" of facial coordination helps people, for example, to feel empathy toward each other. Whereas with conventional video conferencing technology, a participant looks at a monitor showing the person he or she is talking to, and therefore appears to that person to be looking off to the side (for example, above, below, left or right). This lack of direct eye contact creates an impersonal appearance and alters the micro expressions that normally would occur in person or in a real-time video conversation. If the person looks instead at a camera, rather than the monitor, he or she cannot read the face of the other person, and again, loses that eye contact. Therefore, an aspect of an embodiment of the present invention system and method removes such a mismatch, and instead provides the ability correct for the mismatch in "eye gaze." An aspect of an embodiment of the present invention system and method allows people to converse in near real-time while each makes direct eye contact with the other. The effect is a more lifelike conversation featuring all the normal nuances of facial expression.

To resolve this eye gaze, for example, the location of the eyes of a subject could be adjusted such that even though the subject may be looking at the screen where the remote user is displayed, it would appear to the remote user that the subject was looking directly into the camera at them. It should be appreciated that apparent directions of other regions of the subject may be accomplished as well as desired or required.

An aspect of an embodiment of the present invention provides an image transmission method. The image transmission method may comprise obtaining data of a local subject and processing the data of the local subject to: fit a local model of at least a region of the local subject; and extract parameters of the local model to capture features of the region of the local subject. The method may also include obtaining data of at least one remote subject and processing the data of the remote subject to: fit at least one of at least one region of the remote subject; and extract parameters the remote model to capture features of the region of the remote subject. The method may also include transmitting the extracted parameters of the local region to a remote processor and reconstructing the local image based on the extracted parameters of the local region and the extracted parameters of the remote region. In turn, the method may further include: transmitting the extracted parameters of the remote region to a local processor and reconstructing at least one remote image based on the extracted parameters of the remote region and the extracted parameters of said at least one local region.

An aspect of an embodiment of the present invention provides an image transmission system. The system may comprise a local obtaining means for obtaining data of a local subject and a local processor for processing the data of the local subject to fit a local model of at least a region of the local subject and extract parameters of the local model to capture features of the region of the local subject. The system may also include a remote obtaining means for obtaining data of at least one remote subject and a remote processor for processing the data of the remote subject to fit at least one of at least one region of the remote subject and extract parameters the remote model to capture features of the region of the remote subject. The system may also include a local transmitting means for transmitting the extracted parameters of the local region to a remote processor and a remote reconstruction means for reconstructing the local image based on the extracted parameters of the local region and the extracted parameters of the remote region. In turn, the system may further include: a remote transmitting means for transmitting the extracted parameters of the remote region to a local processor and a local reconstruction means for reconstructing at least one remote image based on the extracted parameters of the remote region and the extracted parameters of said at least one local region.

It should be appreciated that any of the steps, processes, systems, or devices for transmitting the parameters themselves may not necessarily be transmitted directly, but may be transformed for transmission. For example, they may be transformed whereby they are further compressed, processed, changed, moved or rotated into a different parameter space.

These and other objects, along with advantages and features of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF THE INVENTION

Figure 1:
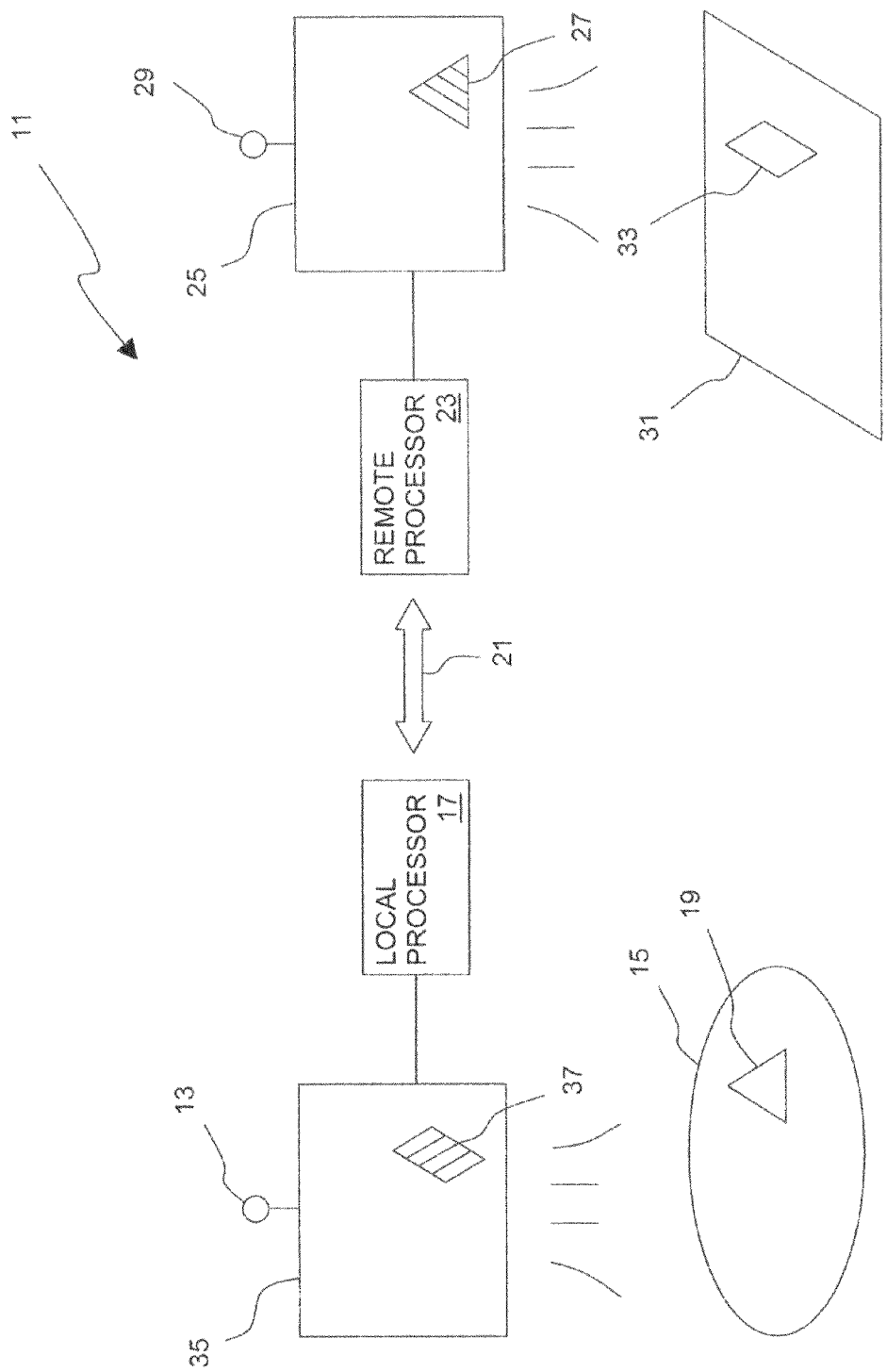
FIG. 1 provides a schematic diagram of an aspect of an embodiment of the present invention image transmission system.

Referring to FIG. 1, FIG. 1 provides a schematic diagram of an aspect of an embodiment of the present invention that provides an image transmission system 11 comprising a local data obtaining means 13 for obtaining data of, for example, at least one local subject 15. The system 11 may further include a local processor means 17 for processing the data of the local subject 15 to: fit at least one local model of at least one region 19 of the local subject 15; and extract parameters of the local model to capture features of the region 19 of the local subject 15. The system may 11 further comprise a transmission means 21 for transmitting the extracted parameters to a remote processor 23. The system may 11 further comprise a remote data obtaining means 29 for obtaining data of at least one remote subject 31. The remote processor means 23 may be provided for processing the data of the remote subject 31 to: fit at least one local model of at least one region 33 of the remote subject 31; and extract parameters of at least one remote model to capture features of region 33 of remote subject 31. The system 11 may further include reconstructing at least one local image based on the extracted parameters of at least one local region and the extracted parameters of the remote region. The reconstruction means may be accomplished by the local processor (or other processor) adapted for: determining the relative location of local subject 15 to the local capturing means 13; and rotating the reconstructed local image to achieve motion parallax three-dimensionality. The aforementioned features may comprise of at least one of: appearance, location, orientation, lighting, shape, structure, texture, behavior or some combination thereof for any subject (or subjects) or region (or regions) of any subject(s). Other features may, of course, be employed within the context of the embodiments of the invention.

It should be appreciated the designated region 19 of the local subject 15 may be one of face, eye, head, body, torso, limbs, or some combination thereof. Other regions may, of course, be employed within the context of the embodiments of the invention.

A remote display 25 may be provided to display means the reconstructed local image 27 of the region of local subject.

It should be appreciated that any of the components, means, devices or modules referred to with regards to any of the present invention embodiments discussed herein, may be integrally or separately formed with one another. Further, redundant functions or structures of the components, means, devices or modules may be implemented. Moreover, the various components may be communicated locally and/or remotely with any users, subjects, objects, advertisers, game systems, modules, databanks, artificial intelligent systems, telephones, computers, systems, hardware, audiences, clinicians, patients, computers, processors, users, vehicles, ships, water craft, weapon systems, satellites, buildings, robots, air and space craft, artificial intelligent systems, and/or systems. Moreover, the various components may be in communication via wireless and/or hardwire or other desirable and available communication means, systems and hardware. There may be more than one local or remote locations and any number of users, subjects, objects, advertisers, game systems, modules, databanks, artificial intelligent systems, telephones, computers, systems, hardwares, audiences, clinician, patients, computers, processors, users, vehicles, ships, water craft, weapon systems, satellites, buildings, robots, air and space craft, artificial intelligent systems, and/or systems may be at any of the locations (or in communication with such locations). It should be appreciated that the local or remote locations may be of varying degrees as desired or required.

The reconstructed local image may be the same as at least one of the local regions of at least one local subject. For example, the reconstruction of the subject's nose may be intended to be an accurate replication of the subject's nose. On the other hand, at least one reconstructed local image may be different than at least one local regions of at least one local subject. For example, the reconstruction of the subject's nose is intended to be a replication of the subject's mouth at the place of the subject's nose instead. Further yet, at least one reconstructed local image may be at least one animation or at least one animated character. For example, the animation may be a cartoon or artistic figure. Further yet, at least one reconstructed local image may be at least one inanimate objet. For instance, an inanimate object may be a robot or non human. Moreover, the reconstruction may be provided by the use of artificial intelligence, expert systems, scripts, archives, data bases that are generated or provided specifically for the person(s) (audience) or random person(s) (audiences) that they are intended for; or in response to the feedback received from person(s) (audience), as well as some combination thereof. Still yet, the at least one reconstructed local image may be at least one predetermined object. For instance, predetermined object may be at the same location as at least one local region of at least one local subject; or may be a different location as at least one local region of at least one local subject. Moreover, at least one reconstructed local image may be a local region of a different subject or subjects. Still further yet, at least one local reconstructed image is a separate character.

For instance, reconstruction may provide the ability to conceal the identity of the subject or a portion of the subject. Similarly, the reconstruction may provide to ability to alter (in whole or in part) the race, gender, ethnicity, age or other traits, features, and characteristics of a subject, or portions of a subject. For instance, the reconstruction may provide the use of this in customized advertisements (or other type of messages or communications) generated specifically for the person(s) (audience) they are intended for. Alternatively, the customized advertisement may be generated in response to the audience or user. For instance, the reconstruction may provide the use of this in customized sports-casters or other media or subject personnel generated specifically for the person(s) (audience) they are intended for, as well as in responses received hack from the persons or audiences. Moreover, for example, an inanimate object used with advertisement may change or alter, such as a regular soda changing to a diet soda. Any prop, subject, or object in an advertisement or other media transmission (or any communication) may be altered. Alternatively, a media personnel, advertiser, or other figure may smile more or less depending on intentions and/or feedback (as well as changing any other facial expression or moving any body part, as well as altering the voice or content of message). Identity (or content) alteration may be useful for identity (or content) security or deliberate identify (content) obfuscation or concealment, or other types of encryption. Identity or content alteration may be useful to provide anti-tampering as well. Identify (content) alteration may be useful for marketing and psychological applications.

In the process of reconstruction, as an aspect of an embodiment of the present invention system and method, the features, perceptions, characteristics, impressions, and actions of a subject may be taken into according to gender [19].

It should be appreciated that the least one region of the at least one local subject comprises may be at least one of: face, eye, head, body, torso, limbs, or some combination thereof (as well as any anatomy part or portion of an anatomy part—interior or exterior—of a human or animal). For medical applications, for example, the regions may be at the interior or subcutaneous of the human or animal. Further, the at least one region of said at least one local subject may comprise at least a portion of said at least one local subject. Similarly, the at least one region of said at least one local subject may comprise the entirety of said at least one local subject.

Next, the local and/or remote models may be parameterized either statistically or arbitrarily, either manually or automatically. It should be appreciated that the local and/or remote models may be a variety of types including, but not limited thereto, an Active Appearance Model (AAM) or Morphable Object Model, or some combination thereof.

In the case of the Active Appearance Model (AAM), the shape, s, of the AAM is provided by the formula:

$$S = S_0 + \sum_{i=1}^{m} si, pi, \quad (1)$$

The generated AAM appearance image, A(x), is provided by the formula:

$$A_0(x) = A_0(x) + \sum_{i=1}^{l} \lambda_i A_i(x) \ \forall \ x \in s_0, \quad (2)$$

The shape component, s, of an AAM is represented by n two-dimensional (2D) vertices, $s_0=(x_1, y_1, \ldots, x_n, y_n)^T$, connected to form a triangulated mesh, to determine a set of basis shapes, $s_i$, that define the allowed variation in the shape, and wherein the coefficients $p_i$, are shape parameters that represent the shape, s. The appearance component, A(x), of said AAM is defined as an image, $A_0$(x) formed of the pixels $x=(x, y)^T \epsilon s_0$, and a set of basis images, $A_i$,(x). that define the allowed variation in the appearance, wherein:

$A_0$(x) is the mean image and $A_i$(x) are the (reshaped) eigenvectors corresponding to the l largest eigenvalues.

An aspect of an embodiment of the present invention method and system includes various approaches of displaying at least one reconstructed image of at least one region of the local subject (or the entire subject) as desired or required. The displaying may occur on at least one of the following: monitor, panel, screen, printer, paper, projector, lap top, or any combination thereof (as well as any available displays means, device or system referenced or available). Still yet, the displaying may occurs on at least one of the following modules: computers, televisions, projectors, PDAs, telephones, cellular telephones, satellite telephones, land vehicles, military vehicles, infrared cameras, infrared video systems, navigation equipment, GPS, air craft, space craft, water crafts and ships, and land vehicles, lap top computers, notebook computers, processors or any combination thereof. It should be appreciated that any available display means or method may be employed within the context of one or more embodiments of the invention.

In an approach at least one reconstructed local image is a view of the same local region, rotated appropriately for the viewing angles of at least one remote subject. For instance, a remote obtaining means is utilized for obtaining the data of at least one remote subject; wherein the:

viewing angles comprise horizontal viewing angles, θ, and vertical viewing angles, φ;

horizontal viewing angles, θ, and vertical viewing angles, φ, can be calculated from the overall displacement of said at least one region of said at least one remote subject along horizontal axes, x, and vertical axes, y, and the estimated distance from said obtaining means, d, using the following formula:

$$\theta = \arcsin\frac{x}{d}$$
$$\phi = \arcsin\frac{y}{d}.$$

Next, the effect of changes to d as said at least one remote region of said remote subject moves is approximated as inversely proportional to the change in horizontal and vertical size of the user's face, as provided by the following formula:

$$d = d_0 * \frac{xSize_0}{xSize}$$

where xSize is the current width of said at least one region of said remote region, $d_0$ is the manually tuned approximate distance, and $xSize_0$ is the horizontal width of said at least one region of said remote region at the time of tuning.

The means or method of obtaining data may comprise: capturing image or video data. Further, the means or method of obtaining data may comprise generating data from a computer model. The means or method of obtaining data may be accomplished by a remote obtaining means for obtaining said data of at least one remote subject (or local subject). The obtaining means may comprise at least one of the following: video system, video-conference system, camera, infrared camera or video system, charge-coupled device (CCD), complementary-metal-oxide-semiconductor (CMOS), or any combination thereof (as well as any available image or data obtaining means, device or system referenced or available).

Image Stabilization

It should be noted that image stabilization technology (systems and methods) may, be employed within the context of various embodiments of the present invention system and method. Image stabilization is a form of technology used to stabilize an image for a much clearer picture. It may be used in both still and video cameras. As the telephoto features of a camera are used, image stabilization becomes more important for producing the sharpest photos. Similarly, if images are obtained with the various embodiments of the present invention system and method, for example but not limited thereto using a cellular telephone, stabilization becomes important. The farther the distance of the subject from the camera (as well as other challenges), the more distorted the image can become due to even the slightest fluctuation in motion. In still photos, this will cause the main subjects to become out of focus. For video cameras, it will cause jitters in the footage. There are a couple of techniques that are often employed in image stabilization. One is optical stabilization and can be used in digital or still cameras. Digital image stabilization is used primarily in some video cameras. Both take slightly different approaches and have their own advantages. It should be appreciated that any available stabilization approaches and technologies may be implemented with the various aspects of the present invention. In optical image stabilization, sensors are placed in the lens to detect vertical movement and horizontal movement. The lens is then stabilized for these effects in order to get a clear picture. This all happens nearly simultaneously with the shaking. This system will take care of most natural fluctuations a photographer may have in his or her hands. For example, if the body of the camera moves up, the lens will move down to compensate.

In digital image stabilization, the methodology takes a slightly different tack. Instead of dealing with the lens portion of the camera, the digital image stabilization technique shoots more of a frame than is actually shown. Then, the image stabilization happens by moving the frame slightly with each motion so that the image appears stable, even when it may not be. It should be appreciated that any available stabilization means, device or system referenced or available may be implemented with the embodiments discussed herein.

The image transmission method comprises at least one of the following transmission method types: video-conference, television, closed-circuit television, internet, intranet, monitor, processor-to-processor, computer-to-computer, cellular telephones, telephonic, satellite, satellite telephones, hard wire, wireless, or some combination thereof (as well as any available transmission means, device or system referenced or available). Similarly, the transmitting may comprise: transmission of the at least local region, including transmission of a single image or sequence of images, video, videoconferencing, computer animation, or any combination thereof. Moreover, the transmitting may occur to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

It should be appreciated that a subject may include a human, animal or inanimate object.

Next, still referring to the image transmission system 11, the system 11 may be adapted to provide for transmitting the extracted parameters of the at least one remote region to at least one local processor; and reconstructing at least one remote image based on said extracted parameters of said at least one remote region and said extracted parameters of said at least one local region. The reconstruction means may be accomplished by the remote processor (or other processor) adapted for: determining the relative location of said remote subject 31 to said remote capturing means 29; and rotating said reconstructed remote image to achieve motion parallax three-dimensionality. The aforementioned features may comprise of at least one of: appearance, location, orientation, lighting, shape, structure, texture, behavior or some combination thereof for any subject (or subjects) or region (or regions) of any subject(s). It should be appreciated the designated region 33 of the remote subject 31 may be one of face, eye, head, body, torso, limbs, or some combination thereof. A local display 35 is provided to display means the reconstructed local image 37 of the region of remote subject.

The at least one reconstructed remote image may be the same as the at least one remote region of at least one remote subject. The at least one reconstructed remote image may be different than at least one remote region of the at least one remote subject. The at least one reconstructed remote image may be at least one animation or at least one animated character. The method at least one reconstructed remote image is at least one inanimate object. The at least one reconstructed remote image may be at least one human or animal. The at least one reconstructed remote image may be at least one predetermined object. The at least one predetermined object may be the same location as the at least one remote region of the at least one remote subject. The at least one predetermined object may be a different location as the at least one remote region of at least one remote subject. The at least one reconstructed remote image may be at least one remote region of a different subject or a different than at least one remote subject. The at least one remote reconstructed image is a separate character. The method of reconstructing at least one remote image is based on at least one of the following: artificial intelligence, expert systems, scripts, archives, data bases or some combination thereof.

The at least one region of at least one remote subject may comprise at least a portion of at least one of: face, eye, head, body, torso, limbs, or some combination thereof. The at least one region of at least one remote subject may comprise at least one eye; and wherein at least one reconstructed remote image based on the eye is adjusted to alter the apparent direction of at least one reconstructed eye (so as to fix eye gaze). The at least one region of at least one remote subject may comprises at least a portion of at least one remote subject. The at least one region of at least one remote subject may comprise the entirety of at least one remote subject.

The method may comprise a local displaying of at least one reconstructed image of at least one region of at least one remote subject. The local displaying may occur on at least one of the following: monitor, panel, screen, printer, paper, projector, lap top, or any combination thereof. The local displaying may occurs on at least one of the following modules: computers, televisions, projectors, PDAs, telephones, cellular telephones, satellite telephones, land vehicles, military vehicles, air craft, space craft, water crafts and ships, and land vehicles, lap top computers, notebook computers, net book computers, tablet computers, robots, processors or any combination thereof.

The at least one reconstructed remote image may be a view of the same remote region, rotated appropriately for the viewing angles of at least one local subject. The method may comprise: a local obtaining means for obtaining the data of at least one local subject; wherein the viewing angles comprise horizontal viewing angles, $\theta$, and vertical viewing angles, $\phi$; wherein the horizontal viewing angles, $\theta$, and vertical viewing angles, $\phi$, can be calculated from the overall displacement of at least one region of at least local subject along horizontal axes, x, and vertical axes, y, and the estimated distance from the obtaining means, d, using the following formula:

$$\theta = \arcsin\frac{x}{d}$$

$$\phi = \arcsin\frac{y}{d}.$$

The effect of changes to d as at least one local region of the local subject moves is approximated as inversely proportional to the change in horizontal and vertical size of the user's face, as provided by the following formula:

$$d = d_0 * \frac{xSize_0}{xSize}$$

where xSize is the current width of at least one region of the local region, $d_0$ is the manually tuned approximate distance, and $xSize_0$ is the horizontal width of at least one region of the local region at the time of tuning.

The remote and local obtaining data step(s) may comprise capturing image or video data. The remote and local obtaining data step(s) may comprises generating data from a computer model. A local obtaining means, device or system is utilized for obtaining said data of at least one local subject. The local obtaining means may comprise at least one of the following: video system, video-conference system, camera, charge-coupled device (CCD), complementary-metal-oxide-semiconductor (CMOS), or any combination thereof. A remote obtaining means, device or system may be used for obtaining data of at least one remote subject. The remote obtaining means may comprise at least one of the following: video system, video-conference system, camera, charge-coupled device (CCD), complementary-metal-oxide-semiconductor (CMOS), or any combination thereof.

The image transmission method may comprise at least one of the following transmission method types: video-conference, television, closed-circuit television, internet, intranet, monitor, processor-to-processor, computer-to-computer, cellular telephones, telephonic, satellite, satellite telephones, hard wire, wireless, or some combination thereof. The remote transmitting step(s) may comprise: transmission of at least remote region, including transmission of a single image or sequence of images, video, videoconferencing, computer animation, or any combination thereof. The remote transmitting may occurs to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

The subject may comprise a human, animal, animated or inanimate object; or some combination thereof.

It should be appreciated that any activity, step, process, sequence, or procedure discussed, disclosed or referenced herein may be interchangeable between remote and local applications. Similarly, it should be appreciated that any means, system, device, module, processor, equipment, or apparatus discussed, disclosed or referenced herein may be interchangeable between remote and local applications.

It should be appreciated that obtaining data or invoking any process as it may apply with any object, subject or region may include more than one object, region or subject as desired or required. For instance, "local subject or object" (or remote) may not be a single subject or object, but rather a collection of subjects or objects or parts of subjects or objects, such as a moving landscape (animated or otherwise).

Active Appearance Models

An Active Appearance Model (AAM) is a generative, parametric model that encapsulates a compact statistical representation of the shape and the appearance of an object [5]. AAMs are most commonly used to track [7] and synthesize [12] faces in images and video sequences, where the compact nature of the model allows faces to be tracked, manipulated and rendered all at video frame-rate and during live face-to-face conversation over a video-link [14].

The shape component of an AAM is represented by n two-dimensional (2D) vertices, $s_0 = (x_1, y_1, \ldots, x_n, y_n)^T$, connected to form a triangulated mesh, and a set of basis shapes, $s_i$, that define the allowed variation in the shape. Any particular instance of a shape is generated from a linear combination of the basis shapes added to $s_0$:

$$S = S_0 + \sum_{i=1}^{m} si, pi, \qquad (1)$$

where the coefficients $p_i$, are the shape parameters that represent the shape s. The shape component of an AAM is typically computed by applying principal components analysis (PCA) to a set of shapes hand-labeled in a set of images. In this instance $s_0$ is the mean shape and the vectors $s_i$, are the (reshaped) eigenvectors corresponding to the m largest eigenvalues. The vertices that define the structure of the shape are typically chosen to delineate the facial features (eyes, eyebrows, nose, mouth, and face outline), and all shapes must have the same number of vertices, and they must follow the same ordering in all images. To ensure the model is sufficiently generative, i.e. all facial expressions of interest can be represented as some combination of the basis vectors, the hand-labeled images should contain a suitably diverse collection of facial expressions.

Figure 2:
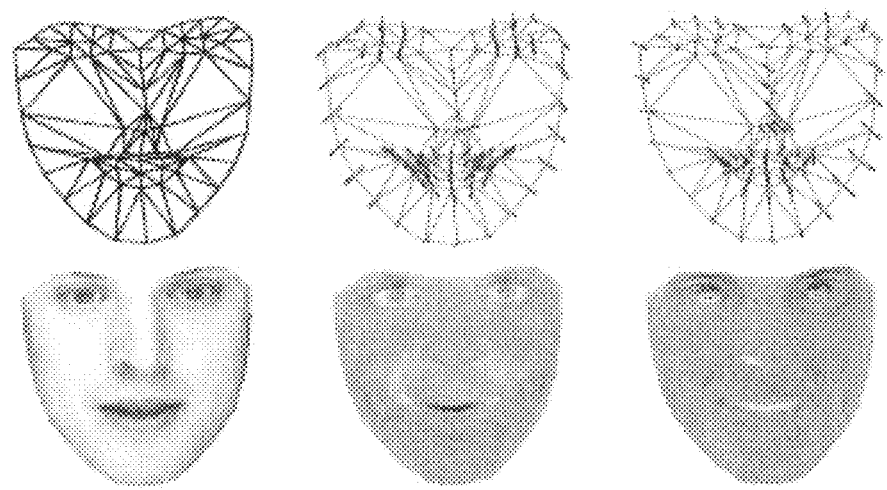
FIG. 2 illustrates the shape (top row) and appearance (bottom row) components of an AAM. For each row, the left column illustrates the mean shape/appearance, and the center and right columns represent the first two modes of variation of the shape/appearance components, respectively.

The appearance component of an AAM is defined as an image, $A_0(x)$ formed of the pixels $x=(x, y)^T \epsilon s_0$, and a set of basis images. $A_i,(x)$. that define the allowed variation in the appearance. The appearance component of an AAM is computed by first shape normalizing the images by warping from the hand-labeled vertices to $s_o$, then applying PCA to the resultant image set. Again, $A_0(x)$ is the mean image and $A_i(x)$ are the (reshaped) eigenvectors corresponding to the l largest eigenvalues. As with the shape, any particular shape-normalized image is generated using a linear combination of the basis images added to $A_0(x)$:

$$A_0(x) = A_0(x) + \sum_{i=1}^{l} \lambda_i A_i(x) \ \forall \ x \in s_0 \qquad (2)$$

where the coefficients $\lambda_i$ are the appearance parameters. See the bottom row of FIG. 2 for an example of an appearance component of an AAM.

To render a near-photorealistic image of a face from a set of AAM parameters, first the shape parameters, $p=(p_1 \ldots p_m)^T$, are used to generate the shape, s, of the AAM using Eq. (1). Next the appearance parameters $\lambda=(\lambda_1, \ldots, \lambda_l;)$ are used to generate the AAM appearance image, A(x), using Eq. (2). Finally A(x) is warped from $s_0$ to the generated shape s.

To label an existing image automatically with an existing AAM, an analysis-by-synthesis approach is used. First, an initial estimate of the parameters that represent the shape and appearance in the image of interest is generated. In the case of videoconferencing, the parameters representing the previous frame can be considered a likely starting point. Next an image is synthesized by applying the parameters to the model, and finally a gradient-descent error minimization is used update the parameters to minimize the residual between the image being fitted to and the model-synthesized image. There are a wealth of algorithms proposed for performing this minimization (7). The trade-off is typically speed versus accuracy.

Multi-Segment Models

The standard approach to constructing the appearance component of the AAM is to warp the images onto $s_0$ and concatenate all pixels bound by the mesh before applying PCA. The assumption is that the probability distribution of the pixel intensities can be modeled as a Gaussian. However, this is generally not the case when considering faces and consequently some important information is considered noise and discarded, which results in blurring in the rendered images. This is most striking in the eyes and inner mouth which tend to be important areas of the face. An extension to improve the quality of rendering is to construct a piece-wise PCA by building independent appearance models for the different regions of the face (skin, eyes, inner-mouth). This can be done in the coordinate frame of $s_o$, so the pixel indices for the different regions of the face are constant across all images. The appearance for the individual segments can then be regenerated and copied into the appearance vector A(x) before warping to the shape s. This also allows different model segments to be encoded with more or less resolution, allocating more resources to regions of the face on which a viewer's attention is likely to be focused, such as the eyes and mouth.

Motion Parallax

Motion parallax is a visual effect by which humans gauge the distance to objects [9]. It is caused by the apparent rotation of an object as the viewer moves around that object. That is, when the viewer moves to her right, she is able to see more of the object's left side.

Apparent motion parallax is achieved by estimating the user's viewing angle with respect to the screen and rotating the generated view appropriately. We assume for the purposes of systems and methods discussed herein that the user should see an unrotated view of the co-conversant when the user's face is centered at (0,0). In most cases, the apparent horizontal and vertical viewing angles (θ and φ, respectively) can be calculated from the overall displacement of the face along the horizontal and vertical axes (x and y respectively), and the estimated distance from the camera d.

$$\theta = \arcsin\frac{x}{d}$$

$$\phi = \arcsin\frac{y}{d}$$

While the distance d to the camera can be precisely calculated if the actual size of the user's face and the focal length of the camera are known, we have found it more expedient to simply provide the user with a tool to adjust the distance manually, requesting that they adjust it until the parallax effect is achieved. The effect of changes to d as the user moves in conversation can be approximated as inversely proportional to the change in horizontal and vertical size of the user's face. That is:

$$d = d_0 * \frac{xSize_0}{xSize}$$

where d is the approximate current distance, xSize is the current width of the face, $d_0$ is the manually tuned approximate distance, and $xSize_0$ is the horizontal width of the face at the time of tuning.

Figure 7:
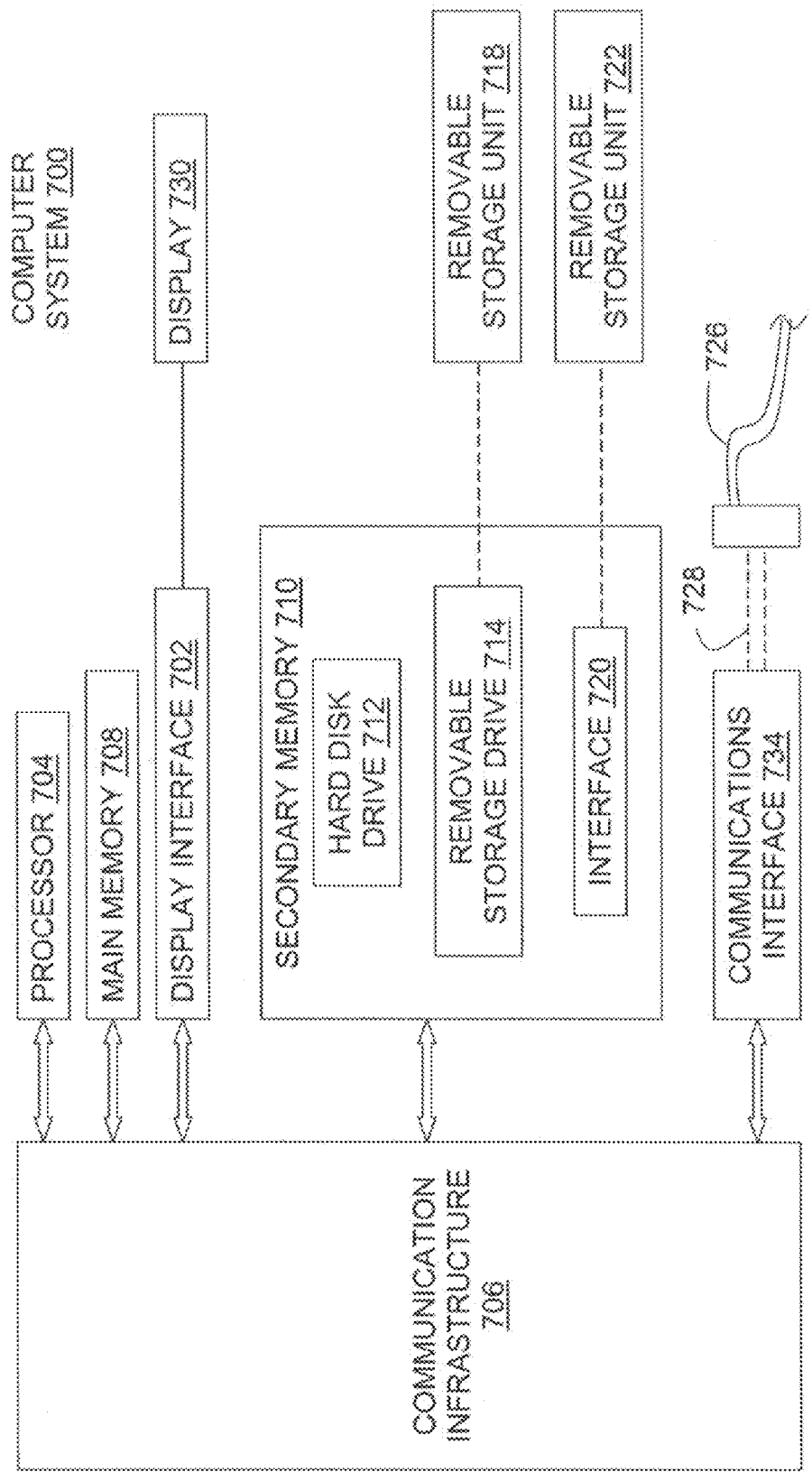
FIG. 7 is a schematic block diagram for an exemplary system or related method of an embodiment or partial embodiment of the present invention.

Turning to FIG. 7, FIG. 7 is a functional block diagram for a computer system 700 for implementation of an exemplary embodiment or portion of an embodiment of present invention. Although it should be appreciated that a wide variety of computer and processor approaches may be implemented. For example, a method or system of an embodiment of the present invention may be implemented using hardware, software or a combination thereof and may be implemented in one or more computer systems or other processing systems, such as personal digit assistants (PDAs) equipped with adequate memory and processing capabilities. In an example embodiment, but not limited thereto, an embodiment of the invention was implemented in software running on a general purpose computer 70 as illustrated in FIG. 7. The computer system 700 may includes one or more processors, such as processor 704. The Processor 704 is connected to a communication infrastructure 706 (e.g., a communications bus, cross-over bar, or network). The computer system 700 may include a display interface 702 that forwards graphics, text, and/or other data from the communication infrastructure 706 (or from a frame buffer not shown) for display on the display unit 730. Display unit 730 may be digital and/or analog.

The computer system 700 may also include a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, a flash memory, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other means for allowing computer programs or other instructions to be loaded into computer system 700. Such means may include, for example, a removable storage unit 722 and an interface 720. Examples of such removable storage units/interfaces include a program cartridge and cartridge interface (such as that found in video game devices), a removable memory chip (such as a ROM, PROM, EPROM or EEPROM) and associated socket, and other removable storage units 722 and interfaces 720 which allow software and data to be transferred from the removable storage unit 722 to computer system 700.

The computer system 700 may also include a communications interface 724. Communications interface 124 allows software and data to be transferred between computer system 700 and external devices. Examples of communications interface 724 may include a modem, a network interface (such as an Ethernet card), a communications port (e.g., serial or parallel, etc.), a PCMCIA slot and card, a modem, etc. Software and data transferred via communications interface 724 are in the form of signals 728 which may be electronic, electromagnetic, optical or other signals capable of being received by communications interface 724. Signals 728 are provided to communications interface 724 via a communications path (i.e., channel) 726. Channel 726 (or any other communication means or channel disclosed herein) carries signals 728 and may be implemented using wire or cable, fiber optics, blue tooth, a phone line, a cellular phone link, an RF link, an infrared link, wireless link or connection and other communications channels.

In this document, the terms "computer program medium" and "computer usable medium" are used to generally refer to media or medium such as various software, firmware, disks, drives, removable storage drive 714, a hard disk installed in hard disk drive 712, and signals 728. These computer program products ("computer program medium" and "computer usable medium") are means for providing software to computer system 700. The computer program product may comprise a computer useable medium having computer program logic thereon. The invention includes such computer program products. The "computer program product" and "computer useable medium" may be any computer readable medium having computer logic thereon.

Computer programs (also called computer control logic or computer program logic) are may be stored in main memory 708 and/or secondary memory 710. Computer programs may also be received via communications interface 724. Such computer programs, when executed, enable computer system 700 to perform the features of the present invention as discussed herein. In particular, the computer programs, when executed, enable processor 704 to perforin the functions of the present invention. Accordingly, such computer programs represent controllers of computer system 700.

In an embodiment where the invention is implemented using software, the software may be stored in a computer program product and loaded into computer system 700 using removable storage drive 714, hard drive 712 or communications interface 724. The control logic (software or computer program logic), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine to perform the functions described herein will be apparent to persons skilled in the relevant art(s).

In yet another embodiment, the invention is implemented using a combination of both hardware and software.

It should be appreciated that the various activities, steps, processes, sequences, or procedures discussed, disclosed or referenced herein may be accomplished on or with a "computer program medium," "computer usable medium" or "computer program product."

In an example software embodiment of the invention, the methods described above may be implemented in SPSS control language or C++ programming language, but could be implemented in other various programs, computer simulation and computer-aided design, computer simulation environment, MATLAB, or any other software platform or program, windows interface or operating system (or other operating system) or other programs known or available to those skilled in the art.

As a result of the statistical representation provided by the AAMs, the bandwidth consumed by this system and related method is meager by today's standards. Because the system only requires a single camera per participant, it could be incorporated into low-bandwidth consumer devices, such as laptops, cell phones, and PDAs, many of which are already manufactured with a single digital camera. These bandwidth needs could be further reduced by applying existing video compression techniques.

Tracking the location of the local user's face with the AAM and displaying an image of the remote participant's face rotated appropriately provides apparent three-dimensionality via motion parallax for increased co-presence. It is hypothesized that this increase in co-presence will be associated with a more comfortable interactive experience. A user study to test this hypothesis empirically is currently in progress.

This system could be combined with other existing systems to provide an even greater sense of co-presence. Multi-camera three-dimensional reconstruction techniques [15, 4, 11] could be used to model the surrounding environment, while our AAM system could provide higher detail using less bandwidth on the face an area of focus during video-conferencing. where small details and high responsiveness are important.

Because the display of each user is reconstructed from a digital model, it is possible to perform manipulations on the transmitted video by altering the model. For example, Theobald, Matthews, Cohin, and Bokser [14] have mapped the appearance of one face onto the motions of a second person by manipulating the AAM. This manipulation allows the generation near-photo-realistic, real-time video where the user's perceived identity, including gender, have been changed. Other possibilities for manipulation include components of expression and the dynamics of conversations. This provides numerous possibilities for research in the social sciences, as well as media applications, such as animation and online games. For example, an online game could capture the expression of a player, transmit it to a central server using negligible bandwidth, and map that expression to the face of the player's character for display to other players. The possibility of undetectable manipulation also raises questions of trustworthiness in video-conferencing.

A limitation of a conventional system is related to the creation of the models. Hand-labeling facial images for an accurate, robust AAM takes approximately two hours, though it need only be done once. This training, if done incorrectly, can add error-variance to the models, resulting in poor fit and unrealistic synthesized video. Models are also susceptible to poor fitting in lighting conditions drastically different from the lighting in the trained environment. Further work is therefore needed to better automate this process and reduce the amount of manual training needed by the model. An appropriately automated model would be able to improve its training "on-the-fly" to respond to changes in lighting conditions and environment. Another method to reducing training time might involve the addition of high-resolution 3D face modeling technologies [18] or marker-guided shape mapping technologies [3] to define a high-resolution shape model to guide automated labeling of points for the AAM.

Some work is already in progress on robust generic statistical models, such as CLMs [16]. While these models are not yet viable for real-time tracking and redisplay, they may in the future be easy ways to automatically train, or possibly even replace, the use of AAMs for video-conferencing. Because these models differ only in the way that the fit of the model is achieved, the present system would still be able to interface with them normally.

Even with the current implementation that requires labeling time to create models, it seems likely that users would be willing to devote such time in order to be able to perform high-presence video-conferencing on their mobile devices. The online gaming and chat communities have already demonstrated their willingness to spend long hours tuning avatars to precise specifications, and it seems likely that they would similarly be willing to spend the time required to train an accurate AAM.

As previously mentioned, the size of a complete AAM model file (5-15 megabytes) may make it difficult to share. For those devices such as cellular phones with tight bandwidth restrictions or low processing power, lower resolution models could easily be shared at the beginning of the conversation. To optimize this transfer, devices intending to engage in video-conference might first send specifications about display and camera resolution and bandwidth so that each side could choose an appropriate resolution model or quickly downsample the appearance components of a high-quality model for transmission. Again, multi-segment models could ensure that important areas of the face are rendered at higher resolution than less important areas.

Model size may still pose a problem, however, for the occasional low-bandwidth, high-resolution device in situations where offline model pre-sharing is not possible. In these cases, a model could "trickle" down to the user over a long period of time before the video-conference. For example, a model could be transmitted to a user's cell phone once the co-conversant's contact information was entered. For any video-conference planned more than a few hours in advance, models with adequate resolution could easily be shared in this way.

EXAMPLES AND EXPERIMENTAL RESULTS

Practice of the invention will be still more fully understood from the following examples and experimental results, which are presented herein for illustration only and should not be construed as limiting the invention in any way.
Example No. 1
System Architecture Referring to FIG. 3, the exemplary embodiment system presented includes two computers 317, 323 with commodity digital video cameras 313, 329 and standard displays 325, 335 connected by a network (not shown). As each frame of video captured by a camera is processed by the local computer 317, the system fits the user's AAM to that frame and extracts the appropriate model parameters to capture the image and location of the local user's face. The vertices on the mesh in FIG. 4 represents the features being tracked by the model.

The model parameters are then sent across the network to the remote machine, 323. Using model parameters describing the frame of video of the remote users, the local machine 317 reconstructs the image of the face of remote user 331. The camera-relative location of the face of the local user 315 is then used to perform the appropriate rotations to achieve motion parallax three-dimensionality. In this way, the system can provide head tracking for three-dimensional display, while encoding the image of the user's face as a small number of parameters for low-bandwidth transfer.

Figure 3:
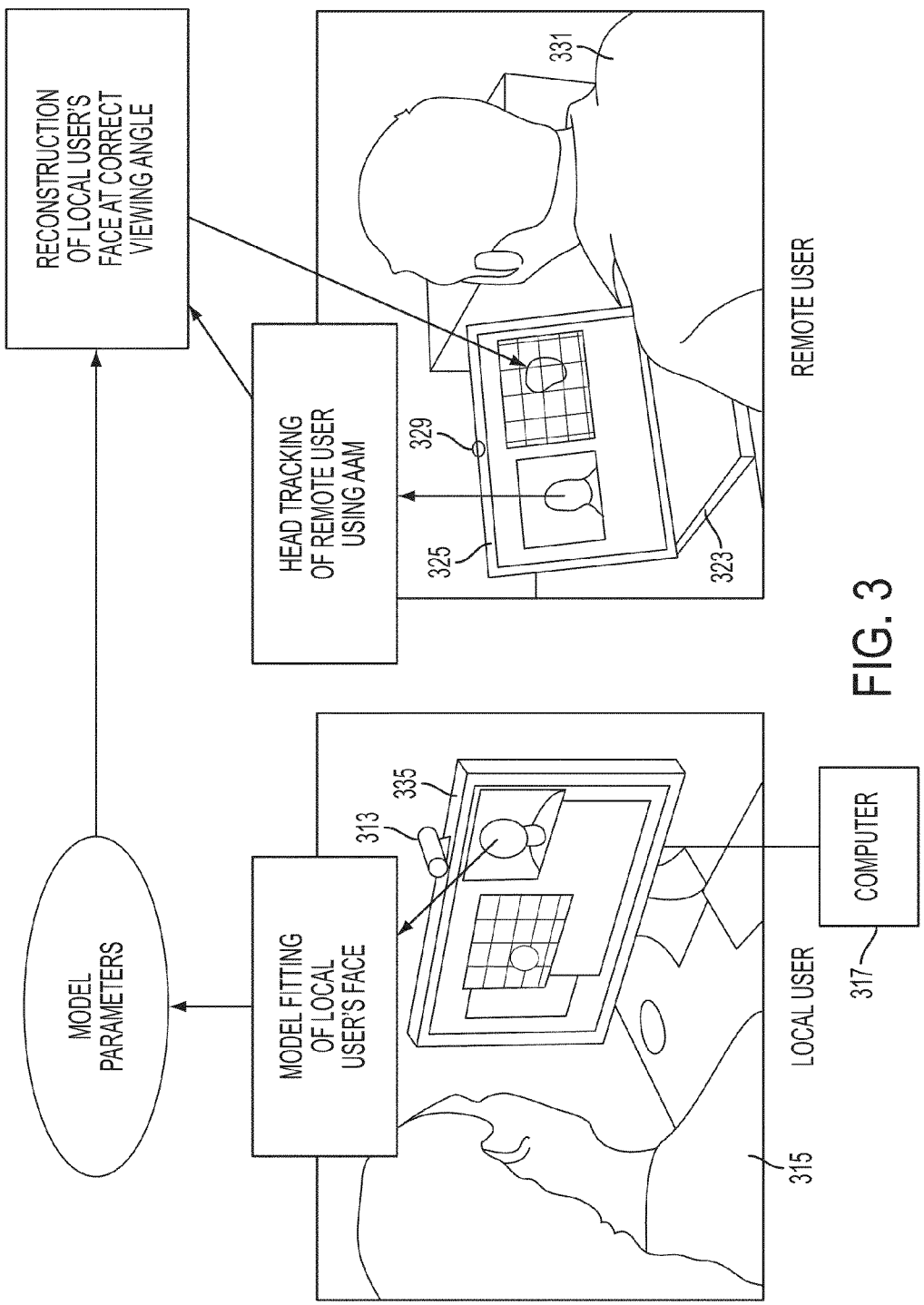
FIG. 3 provides a diagram that illustrates exemplary system architecture. After fitting the local user's AAM to a frame of video, model parameters are sent across the network to the remote user's computer, where they are used to reconstruct the image of the local user.
Figure 4:
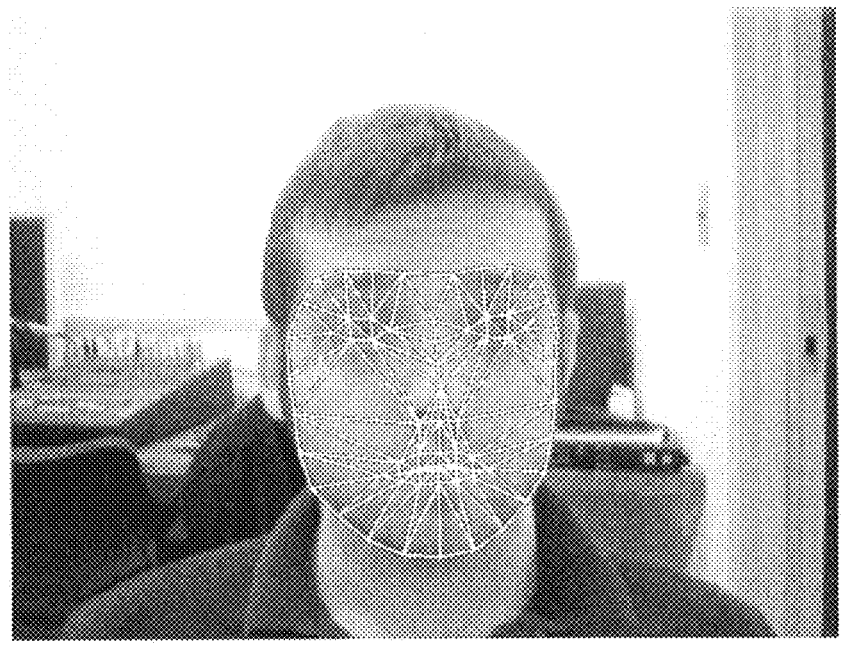
FIG. 4 illustrate the vertices on the mesh that represent features being tracked by the AAM for this user.

In this exemplary approach of FIG. 3, users' faces are displayed over a white computer-generated grid atop a black background. Alternatively, it should be appreciated that the color and/or design of the background may vary; including altering aesthetics or implementing modeling to the background. Background may be altered in response to tracking of a viewer in order to provide an appropriate context to what is displayed to that user. A variety of techniques could be added to this system to represent and transmit the background of the frame. Past groups have used computer-graphics constructed shared environments [11] or pre-shared images of a static background [17] to solve this problem. While neither of these approaches is incompatible with our current system, these techniques are considered part of an aspect of an embodiment of the present invention and may be employed within the context of the an embodiment of the invention.

Figure 5:
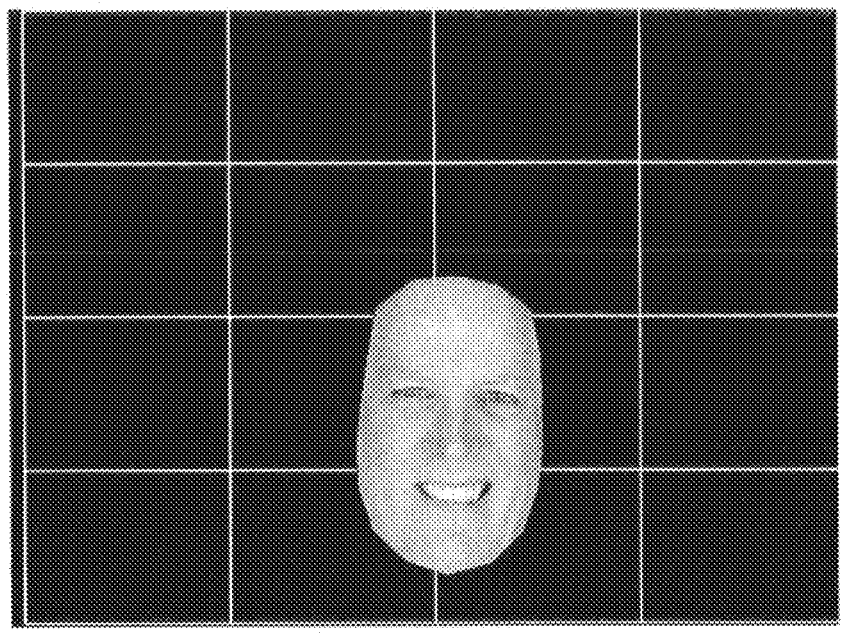
FIG. 5 provides an example of a reconstructed facial image.
Figure 6:
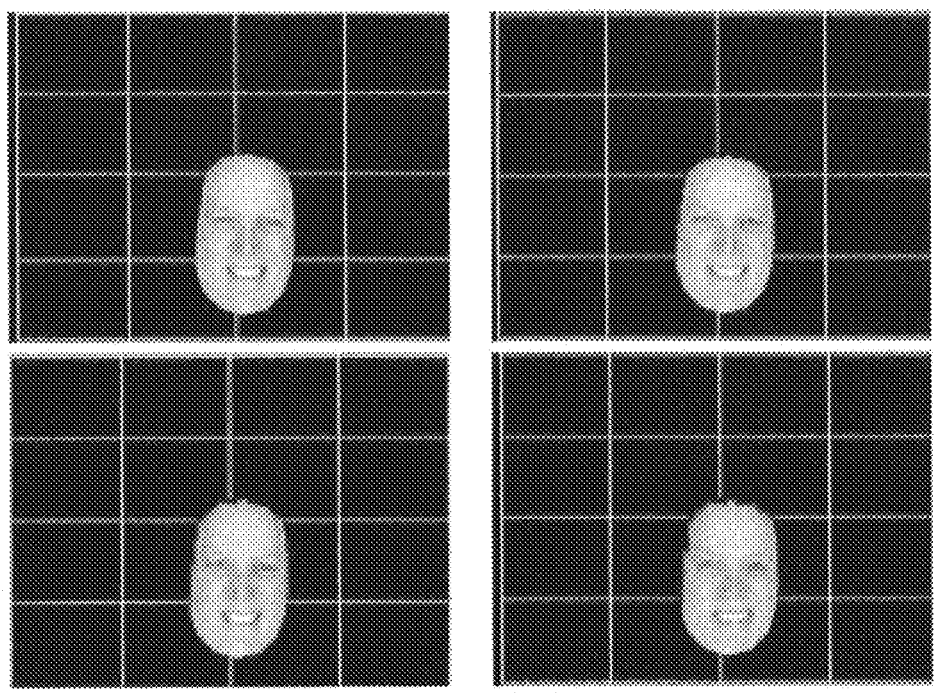
FIG. 6 provides the images that were the result of downsampling; in order from top-left to bottom-right, the model generating each image is of size 3 MB, 1.6 MB, 925 KB, and 400 KB. The fully rendered image, shown in FIG. 5, uses a model of size 13 MB.

It shall be noted that each computer may have access to pre-constructed AAMs of both the local and remote user. The model need only be shared once. While the model of the local user is large (on the order of tens of megabytes for a model at video-conference resolution) in comparison to the size of the set of parameters needed to reconstruct a given frame of video (on the order of hundreds of bytes), a majority of the data is not needed to reconstruct the image at the remote machine. Instead, only the mapping from the parameters to the final reconstructed image must be shared. This reduces the size of the models from approximately 45 MB to between 5 and 15 MB, depending on the resolution of the model images and the complexity of the model. The hulk of the model size is due to the appearance eigenvectors, each of which is a mapping from a parameter to each pixel—essentially a full-resolution image in itself. The size of the models can therefore be reduced by subsampling the mean image and the appearance eigenvectors to reduce the number of pixels represented by the appearance model. A full-face example model, shown in FIG. 5, requires just over 13 MB to perform full quality reconstruction. As seen in FIG. 6, however, it is quite possible to construct a reasonable image after transmitting a model less than a single megabyte in size. Although the resolution of each reconstructed image would be quite low, it might be sufficient for display on, for example, a two-inch-wide cellular phone screen. Also, a multi-segment model could be used to ensure that there is sufficient resolution in the parts of the face that are deemed more important, for example the eyes and mouth.

It would also be possible to send a small but working model before the conversation begins (taking a few minutes to send) and to send improvements to the model as bandwidth allows during the conversation. The addition of a multi-segment model would allow the most important segments to be updated first, while details such as skin texture might follow later.

Because the downsampled model will still use the same parameters as the full-pixel model, it is even possible to reconstruct a higher-resolution image from a lower-resolution camera, provided the original model was trained at the higher resolution. While the individual pixels of this higher-resolution model are not guaranteed to be accurate, the resulting images should still appear to be high-resolution images of the co-conversant and the model will ensure that the resulting face is always valid, in the sense that it will be similar to the images on which the model was trained.
Results While the exact network performance of the system depends on the fidelity of the model and the exact choice of training frames, fully trained models generally require about thirty total parameters (fifteen for shape and fifteen for appearance) for video-realistic reproduction. If each parameter is transmitted at floating-point precision, a thirty-parameter model results in 240 bytes of total data transmitted between the machines per full frame. At these rates, a 30 fps video stream requires a total (two-way) transfer of 7200 Bytes per second, i.e., 57.6 Kbps. This number reflects raw parameter values, and could almost certainly be reduced further by keyframing or using other forms of compression. Theobald, et. al. [13] were able to reduce the transmission size to 3.6 Kbps with minimal perceptual impact.

Two fully trained pre-shared models were used for performance evaluation. A shape model including the eyes, eyebrows, nose, outer and inner mouth, and chin was designed and built. Each model extracted roughly 95% of facial variance within the chosen region and the resulting real-time rendering of the face was near-photo-realistic, as shown in FIG. 5.

One side of the system ran on a Macbook Pro with a Dual-core 2.5 GHz Xeon processor, 4 GB of RAM, and a built-in iSight camera with a resolution of 400×300 pixels. The other side ran on a Mac Pro with Dual Quad-core 3.8 GHz Xeon processors, 8 GB of RAM, and an external iSight camera. To perform fitting, transfer and reproduction, the Macbook Pro required on average 33.2% of the processing power of a single core at any given time, and maintained a maximum memory usage of 75 megabytes of memory. Because the amount of memory usage and processing power scale down with the number of pixels in the fit and reconstructed models, each model could easily be downsampled to match the video and processing capabilities of the receiving device.

In summary, various embodiments of the present invention system and method (or portions thereof) may be utilized for sending apparent 3D video of a face across the Internet at extremely low bandwidth. In a few (~250) bytes, a person's expression can be located, captured, and transferred across the Internet. This can be reconstructed at the far end in a way that makes the face seem like a physical object in the room rather than simply an image on a screen. Tracking and image manipulation allow apparent eye-contact to be made and broken, just like in a face-to-face conversation.

Model mapping further allows the facial expression to be rendered on the face of an avatar or character, potentially one that looks completely different than the original face. This processing (and related system and computer program product) can be done in real-time, and at low enough bandwidth (Dial-up speeds, even for full-frame-rate video) that it should not significantly impinge on gameplay. Fitting data can also allow the rest of the game to be rendered with apparent three-dimensionality.

An aspect of various embodiments of the present invention may be utilized for a number of products and services, such as but not limited thereto, the following:

Videoconferencing—low bandwidth videoconferencing on small-scale electronic devices at high frame rates and with apparent three-dimensionality without the need for expensive data plans;

Eye gaze adjustment—The location of the eyes of a subject (local) could be adjusted such that even though the subject (local) may be looking at the screen where the remote user is displayed, it would appear to the remote user that the subject (local) was looking directly into the camera at them (even though in reality the subject was looking at the screen). Similarly, the alternative is true as well, whereby the remote user may be looking at the screen where the local user is displayed, it would appear to the local user that the remote user was looking directly into the camera at the local user (even though in reality the remote user was looking at the screen).

Research-aided videoconference interaction Experiments show that the manipulations used make the other conversant in a videoconference seem to be much more physically present than with other videoconference tools; and Multiplayer games A player's character in a multiplayer game could mimic the character's facial expressions, which are recorded by a webcam. Low bandwidth would allow multiple players' expressions to be displayed on-screen without adding significant bandwidth requirements.

Customized advertisements (or other communications)—an advertisement (or any messenger, figure or object) transmitted over the Internet (or other transmissions means or mode) to a television or computer display (or other display means or mode), could be customized such that its appearance and motion would be maximally attractive for the particular viewer or viewers seeing/interacting with it. Similar customizations and alterations can be applied to outside advertisements as well.

An aspect of various embodiments of the present invention (or portions thereof) may provide a number of advantages, such as but not limited thereto, the following:

1) Low bandwidth.
2) High perception of co-conversant presence.
3) Ability to modify generated image in a manner that is viable for the face of the specific person in question.

In short, an aspect of an embodiment of the system and method provides, among other things, a real-time, high frame-rate, low-bandwidth video-conferencing system that provides an experience of co-presence via motion parallax using a single commodity camera. The system and method will increase the acceptance and usage of image transmission, such as video-conferencing technologies, as communications tools by bringing these qualities to consumer devices and other technologies and industries.

References

The following patents, applications and publications as listed below and throughout this document are hereby incorporated by reference in their entirety herein.

The devices, systems, algorithms, computer program products, and methods of various embodiments of the invention disclosed herein may utilize aspects disclosed in the following references, applications, publications and patents and which are hereby incorporated by reference herein in their entirety:

[1] K. Akiyama. N. Tetsutani, M. Ishibashi, S. Ichinose. and H. Yasuda. Consideration on three-dimensional visual communication systems. Journal on Selected Areas in Communications. 9(4). 1991.

[2] W. Barfield, C. Hendrix, and K. Bystrom. Visualizing the structure of virtual objects using head tracked stereoscopic displays. In Proceedings of the 1997 Virtual Reality Annual International Symposium, 1997.

[3] B. Bickel, M. Botsch. R. Angst, W. Matusik, M. Otaduy, H. Pfister, and M. Gross. Multi-scale capture of facial geometry and motion. ACM Transactions on Graphics, 20(3): 1-10, 2007.

[4] W.-W. Chen, H. Towles, L. Nyland, G. Welch, and H. Fuchs. Toward a compelling sensation of telepresence: Demonstrating a portal to a distant (static) office. In T. Ertl., B. Hamann. and A. Varshney, editors, Proceedings Visualization 2000, pages 327-333, 2000.

[5] T. Cootes, G. Edwards, and C. Taylor. Active appearance models. IEEE Transactions on Pattern Analysis and Machine Intelligence. 23(6):681-685, June 2001.

[6] B. Lei and E. Hendriks. Middle view stereo representation: An efficient architecture for teleconference with handling occlusions. In IEEE International Conference on Image Processing, 2001.

[7] I. Matthews and S. Baker. Active appearance models revisited. International Journal of Computer Vision. 60(20): 135-164. 2004.

[8] T. H. D. Nguyen, T. C. T. Qui, K. Xu. A. D. Cheok, S. L. Teo, Z. Zhou, A. Mallawaarachchi, S. P. Lee, W. Liu, H. S. Teo, L. N. Thang, Y. Li, and. H. Kato. Real-time 3D human capture system for mixed-reality art and entertainment. IEEE Transactions on Visualization and Computer Graphics, 11(6): 706-721, 2005.

[9] B. O'Conaill. S. Whittaker, and S. Wilbur. Conversations over videoconferences: An evaluation of the spoken aspects of video-mediated communication. Human-Computer Interaction, 8(4):389-428, 1993.

[10] S. Prince, A. D. Cheok, F. Farbiz, T. Williamson, N. Johnson, M. Billinghurst, and H. Kato. 3D live: Real time captured content for mixed reality. In Proceedings of the International Symposium on Mixed and Augmented Reality, 2002.

[11] S. Rauthenberg, P. Kauff T, and A. Graffunder. The virtual meeting room: A realtime implementation of a shared virtual environment system using today's consumer technology in connection with the mpeg-4 standard. In Presence 2000: 3rd International Workshop on Presence, 2000.

[12] B. Theobald, J. Bangham, 1. Matthews, and G. Cawley. Near-videorealistic synthetic talking faces: Implementation and evaluation. Speech Communication. 44:127-140, 2004.

[13] B. Theobald, S. Kruse, G. Cawley, and J. Bangham. Towards a low bandwidth talking head using appearance models. Journal of Image and Vision Computing (IVC), 21(13-14):1077-1205, 2003.

[14] B.-J. Theobald, I. A. Matthews, J. F. Cohn, and S. M. Boker. Real-time expression cloning using appearance models. In International Conference on Multimodal Interaction, 2007.

[15] A. van den Hengel, A. Dick, T. Tliormahlen, B. Ward, and P. H. S. Torr. VideoTrace: Rapid interactive scene modelling from video. ACM Transactions on Graphics, 26(3), 2007.

[16] Y. Wang, S. Lucey, and J. Cohn. Enforcing convexity for improved alignment with constrained local models. In IEEE International Conference on Computer Vision and Pattern Recognition (CVPR). June 2008.

[17] K. Yoshikawa, T. Machida, K. Kiyokawa, and H. Takemura. A high presence shared space communication system using 2D background and 3D avatar. In Proceedings of the 2004 International Symposium on Applications and the Internet, 2004.

[18] S. Zhang and P. Huang. High-resolution, real-time 3-d shape acquisition. In IEEE Computer vision and Pattern Recognition Workshop on Real-time 3DSensors and Their Users, volume 3, pages 28-37, 2004.

[19] Boker, S. Cohn, J. Theobald, B., Matthews, I. Mangini, M., Spies, J., Ambadar, Z. and Brick, T. (in press) Something in the Way We Move: Motion, not Perceived Sex, Influences Head Nods in Conversation, Journal of Experimental Psychology: Human Perception & Performance. (http://faculty.virginia.edu/humandynamicslab/wp-content/uploads/2009/05/journal-of-experimental-psychology-human-perception-and-performance-2009-boker.pdt).

a. U.S. Pat. No. 6,272,231 B1 to Maurer, T., et al., "Wavelet-Based Facial Motion Capture for Avatar Animation", Aug. 7, 2001.

b. U.S. Pat. No. 6,876,364 B2 to Buddemeier, U., et al., "Method for Mapping Facial Animation Values to Head Mesh Positions", Apr. 5, 2005.

c. U.S. Pat. No. 7,050,655 B2 to Ho, R., et al., "Method for Generating an Animated Three-Dimensional Video Head", May 23, 2006.

d. U.S. Pat. No. 7,027,618 B2 to Trajkovic, M., et al., "Head Motion Estimation from Four Feature Points", Apr. 11, 2006.

e. U.S. Pat. No. 7,103,211 B1 to Medioni, G., "Method and Apparatus for Generating 3D Face Models From One Camera", Sep. 5, 2006.

f. U.S. Pat. No. 7,106,358 B2 to Valliath, G, et al., "Method, System and Apparatus for Telepresence Communications", Sep. 12, 2006.

g. U.S. Pat. No. 7,176,956 B2 to Rzeszewski, T., et al., "Video Enhancement of an Avatar", Feb. 13, 2007.

h. U.S. Pat. No. 6,549,200 B1 to Mortlock, A., et al., "Generating an Image of a Three-Dimensional Object", Apr. 15, 2003.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. An image transmission method for use with a local obtaining means and a remote obtaining means, said method comprising:
   local obtaining data of at least one local subject;
   processing said data of said at least one local subject to:
      fit at least one local model of at least one region of said at least one local subject; and
      extract parameters of said at least one local model to capture features of said at least one region of said at least one local subject;
   remote obtaining data of at least one remote subject;
   processing said data of said at least one remote subject to:
      fit at least one remote model of at least one region of said at least one remote subject; and
      extract parameters of said at least one remote model to capture features of said at least one region of said at least one remote subject;
   local transmitting said extracted parameters of said at least one local region to at least one remote processor;
   remote reconstructing at least one local image based on said extracted parameters of said at least one local region and said extracted parameters of said at least one remote region;
   wherein said at least one reconstructed local image is a view of the same local region, rotated appropriately for the viewing angles of said at least one said remote subject;
   wherein said viewing angles comprise horizontal viewing angles, θ, and vertical viewing angles, φ;
   wherein said horizontal viewing angles, θ, and vertical viewing angles, φ, can be calculated from the overall displacement of said at least one region of said at least one remote subject along horizontal axes, x, and vertical axes, y, and the estimated distance from the remote obtaining means, d, using the following formula:

$$\theta = \arcsin\frac{x}{d}$$
$$\phi = \arcsin\frac{y}{d}; \text{ and}$$

remote displaying said at least one reconstructed image of said at least one region of said at least one local subject.

2. The method of claim 1, wherein said features of said at least one region of said at least one local subject or said remote subject comprises at least one of:
   appearance, location, size, contours, direction, alignment, movement, orientation, lighting, shape, structure, texture, behavior or some combination thereof.

3. The method of claim 1, wherein said at least one reconstructed local image is the same as said at least one local region of said at least one local subject.

4. The method of claim 1, wherein said at least one reconstructed local image is different than said at least one local region of said at least one local subject.

5. The method of claim 1, wherein said at least one reconstructed local image is at least one animation or at least one animated character.

6. The method of claim 1, wherein said at least one reconstructed local image is at least one inanimate object.

7. The method of claim 1, wherein said at least one reconstructed local image is at least one human or animal.

8. The method of claim 1, wherein said at least one reconstructed local image is at least one predetermined object.

9. The method of claim 8, wherein said at least one predetermined object is the same location as said at least one local region of said at least one local subject.

10. The method of claim 8, wherein said at least one predetermined object is a different location as said at least one local region of said at least one local subject.

11. The method of claim 1, wherein said at least one reconstructed local image is at least one local region of a different subject or a different said at least one local subject.

12. The method of claim 1, wherein said at least one local reconstructed image is a separate character.

13. The method of claim 1, reconstructing at least one local image is based on at least one of the following: artificial intelligence, expert systems, scripts, archives, data bases or some combination thereof.

14. The method of claim 1, wherein said at least one region of said at least one local subject comprises at least a portion of at least one of: face, eye, head, body, torso, limbs, or some combination thereof.

15. The method of claim 1, wherein said at least one region of said at least one local subject comprises at least one eye; and
   wherein said at least one reconstructed local image based on said eye is adjusted to alter the apparent direction of said at least one reconstructed eye.

16. The method of claim 1, wherein said at least one region of said at least one local subject comprises at least a portion of said at least one local subject.

17. The method of claim 1, wherein said at least one region of said at least one local subject comprises the entirety of said at least one local subject.

18. The method of claim 1, wherein at least one of:
   said at least one local model or said at least one remote model is a parameterized either statistically or arbitrarily, either manually or automatically.

19. The method of claim 1, wherein said at least one local or remote parameterized model comprises an Active Appearance Model (AAM) or Morphable Object Model, or some combination thereof.

20. The method of claim 19, further comprising:
   using shape parameters, $p = (p_1,...,p_m)^T$ to generate the shape, s, of the AAM;
   using appearance parameters $\lambda = (\lambda_1,...,\lambda_1;)$ to generate the AAM appearance image, A(x); and
   warping A(x) from $s_0$ to the generated shape, s.

21. The method of claim 20, wherein said shape, s, of the AAM is provided by the formula:

$$S = S_0 + \sum_{i=1}^{m} si, pi. \tag{1}$$

22. The method of claim 21, wherein said generated AAM appearance image, A(x), is provided by the formula:

$$A_0(x) = A_0(x) + \sum_{i=1}^{l} \lambda_i A_i(x) \ \forall \ x \in s_0. \tag{2}$$

23. The method of claim 22, wherein the shape component, s, of an AAM is represented by n two-dimensional (2D) vertices, $s_0 = (x_1, y_1, \ldots, x_n, y_n,)^T$, connected to form a triangulated mesh, to determine a set of basis shapes, $s_i$, that define the allowed variation in the shape, and wherein the coefficients $p_i$, are shape parameters that represent the shape, s.

24. The method of claim 23, wherein said appearance component, A(x), of said AAM is defined as an image, $A_0(x)$ formed of the pixels $x = (x, y)^T \in S_0$, and a set of basis images, $A_i(x)$. that define the allowed variation in the appearance, wherein:
 $A_0(x)$ is the mean image and $A_i(x)$ are the (reshaped) eigenvectors corresponding to the l largest eigenvalues.

25. The method of claim 1, wherein said remote displaying occurs on at least one of the following:
 monitor, panel, screen, printer, paper, projector, lap top, or any combination thereof.

26. The method of claim 1, wherein said remote displaying occurs on at least one of the following modules: computers, televisions, projectors, PDAs, telephones, cellular telephones, satellite telephones, land vehicles, military vehicles, air craft, space craft, water crafts and ships, and land vehicles, lap top computers, notebook computers, net book computers, tablet computers, robots, processors or any combination thereof.

27. The method of claim 1, wherein the effect of changes to d as said at least one remote region of said remote subject moves is approximated as inversely proportional to the change in horizontal and vertical size of the user's face, as provided by the following formula:

$$d = d_0 * \frac{xSize_0}{xSize}$$

where xSize is the current width of said at least one region of said remote region, $d_0$ is the manually tuned approximate distance, and $xSize_0$ is the horizontal width of said at least one region of said remote region at the time of tuning.

28. The method of claim 1, wherein said local and remote obtaining data comprises:
 capturing image or video data.

29. The method of claim 1, wherein said local and remote obtaining data comprises generating data from a computer model.

30. The method of claim 1, wherein said method further comprises:
 providing a remote obtaining means for obtaining said data of at least one remote subject.

31. The method of claim 30, wherein said remote obtaining means comprises at least one of the following:
 video system, video-conference system, camera, infrared camera, infrared video system, charge-coupled device (CCD), complementary-metal-oxide-semiconductor (CMOS), or any combination thereof.

32. The method of claim 1, wherein said method further comprises:
 providing a local obtaining means for obtaining said data of at least one local subject.

33. The method of claim 32, wherein said local obtaining means comprises at least one of the following:
 video system, video-conference system, camera, charge-coupled device (CCD), complementary-metal-oxide-semiconductor (CMOS), or any combination thereof.

34. The method of claim 1, wherein said image transmission method comprises at least one of the following transmission method types:
 video-conference, television, closed-circuit television, internet, intranet, monitor, processor-to-processor, computer-to-computer, cellular telephones, telephonic, satellite, satellite telephones, hard wire, wireless, or some combination thereof.

35. The method of claim 1, wherein said local transmitting comprises:
 transmission of said at least local region, including transmission of a single image or sequence of images, video, videoconferencing, computer animation, or any combination thereof.

36. The method of claim 1, wherein said local transmitting occurs to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

37. The method of claim 1, wherein said subject comprises a human, animal, animated or inanimate object; or some combination thereof.

38. The method of claim 1, further comprising:
 remote transmitting said extracted parameters of said at least one remote region to at least one local processor; and
 local reconstructing at least one remote image based on said extracted parameters of said at least one remote region and said extracted parameters of said at least one local region.

39. The method of claim 38, wherein said at least one reconstructed remote image is the same as said at least one remote region of said at least one remote subject.

40. The method of claim 38, wherein said at least one reconstructed remote image is different than said at least one remote region of said at least one remote subject.

41. The method of claim 38, wherein said at least one reconstructed remote image is at least one animation or at least one animated character.

42. The method of claim 38, wherein said at least one reconstructed remote image is at least one inanimate object.

43. The method of claim 38, wherein said at least one reconstructed remote image is at least one human or animal.

44. The method of claim 38, wherein said at least one reconstructed remote image is at least one predetermined object.

45. The method of claim 44, wherein said at least one predetermined object is the same location as said at least one remote region of said at least one remote subject.

46. The method of claim 44, wherein said at least one predetermined object is a different location as said at least one remote region of said at least one remote subject.

47. The method of claim 38, wherein said at least one reconstructed remote image is at least one remote region of a different subject or a different said at least one remote subject.

48. The method of claim 38, wherein said at least one remote reconstructed image is a separate character.

49. The method of claim 38, reconstructing at least one remote image is based on at least one of the following: artificial intelligence, expert systems, scripts, archives, data bases or some combination thereof.

50. The method of claim 38, wherein said at least one region of said at least one remote subject comprises at least a portion of at least one of: face, eye, head, body, torso, limbs, or some combination thereof.

51. The method of claim 38, wherein said at least one region of said at least one remote subject comprises at least one eye; and
wherein said at least one reconstructed remote image based on said eye is adjusted to alter the apparent direction of said at least one reconstructed eye.

52. The method of claim 38, wherein said at least one region of said at least one remote subject comprises at least a portion of said at least one remote subject.

53. The method of claim 38, wherein said at least one region of said at least one remote subject comprises the entirety of said at least one remote subject.

54. The method of claim 38, further comprising:
local displaying said at least one reconstructed image of said at least one region of said at least one remote subject.

55. The method of claim 54, wherein said local displaying occurs on at least one of the following:
monitor, panel, screen, printer, paper, projector, lap top, or any combination Thereof.

56. The method of claim 54, wherein said local displaying occurs on at least one of the following modules: computers, televisions, projectors, PDAs, telephones, cellular telephones, satellite telephones, land vehicles, military vehicles, air craft, space craft, water crafts and ships, and land vehicles, lap top computers, notebook computers, net book computers, tablet computers, robots, processors or any combination thereof.

57. The method of claim 38, wherein said at least one reconstructed remote image is a view of the same remote region, rotated appropriately for the viewing angles of said at least one said local subject.

58. The method of claim 57, wherein said method comprises:
a local obtaining means for obtaining said data of at least one local_subject;
wherein said viewing angles comprise horizontal viewing angles, $\theta$, and vertical viewing angles, $\phi$;
wherein said horizontal viewing angles, $\theta$, and vertical viewing angles, $\phi$, can be calculated from the overall displacement of said at least one region of said at least local subject along horizontal axes, x, and vertical axes, y, and the estimated distance from said local obtaining means, d, using the following formula:

$$\theta = \arcsin\frac{x}{d}$$
$$\phi = \arcsin\frac{y}{d}.$$

59. The method of claim 58, wherein the effect of changes to d as said at least one local region of said local subject moves is approximated as inversely proportional to the change in horizontal and vertical size of the user's face, as provided by the following formula:

$$d = d_0 * \frac{xSize_0}{xSize}$$

where xSize is the current width of said at least one region of said local region, $d_0$ is the manually tuned approximate distance, and $xSize_0$ is the horizontal width of said at least one region of said local region at the time of tuning.

60. The method of claim 38, wherein said remote and local obtaining data comprises:
capturing image or video data.

61. The method of claim 38, wherein said remote and local obtaining data comprises generating data from a computer model.

62. The method of claim 38, wherein said method comprises:
a local obtaining means for obtaining said data of at least one local subject.

63. The method of claim 62, wherein said local obtaining means comprises at least one of the following:
video system, video-conference system, camera, charge-coupled device (CCD), complementary-metal-oxide-semiconductor (CMOS), or any combination thereof.

64. The method of claim 38, wherein said method comprises:
a remote obtaining means for obtaining said data of at least one remote subject.

65. The method of claim 64, wherein said remote obtaining means comprises at least one of the following:
video system, video-conference system, camera, charge-coupled device (CCD), complementary-metal-oxide-semiconductor (CMOS), or any combination thereof.

66. The method of claim 38, wherein said image transmission method comprises at least one of the following transmission method types:
video-conference, television, closed-circuit television, internet, intranet, monitor, processor-to-processor, computer-to-computer, cellular telephones, telephonic, satellite, satellite telephones, hard wire, wireless, or some combination thereof.

67. The method of claim 38, wherein said remote transmitting comprises:
transmission of said at least remote region, including transmission of a single image or sequence of images, video, videoconferencing, computer animation, or any combination thereof.

68. The method of claim 38, wherein said remote transmitting occurs to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

69. The method of claim 38, wherein said subject comprises a human, animal, animated or inanimate object; or some combination thereof.

70. An image transmission system comprising:
a local obtaining means for obtaining data of at least one local subject;
a local processor for processing said data of said at least one local subject to:
fit at least one local model of at least one region of said at least one local subject; and
extract parameters of said at least one local model to capture features of said at least one region of said at least one local subject;
a remote obtaining means for obtaining data of at least one remote subject;
a remote processor for processing said data of said at least one remote subject to:

fit at least one remote model of at least one region of said at least one remote subject; and extract parameters of said at least one remote model to capture features of said at least one region of said at least one remote subject;

a local transmitting means for transmitting said extracted parameters of said at least one local region to at least one remote processor;

a remote reconstructing means for reconstructing at least one local image based on said extracted parameters of said at least one local region and said extracted parameters of said at least one remote region;

wherein said at least one reconstructed local image is a view of the same local region, rotated appropriately for the viewing angles of said at least one said remote subject;

wherein said viewing angles comprise horizontal viewing angles, $\theta$, and vertical viewing angles, $\phi$;

wherein said horizontal viewing angles, $\theta$, and vertical viewing angles, $\phi$, can be calculated from the overall displacement of said at least one region of said at least one remote subject along horizontal axes, x, and vertical axes, y, and the estimated distance from said remote obtaining means, d, using the following formula:

$$\theta = \arcsin\frac{x}{d}$$
$$\phi = \arcsin\frac{y}{d}; \text{ and}$$

a remote display means for displaying said at least one reconstructed image of said at least one region of said at least one local subject.

71. The system of claim 70, wherein said features of said at least one region of said at least one local subject or said remote subject comprises at least one of:
appearance, location, size, contours, direction, alignment, movement, orientation, lighting, shape, structure, texture, behavior or some combination thereof.

72. The system of claim 70, wherein said at least one reconstructed local image is the same as said at least one local region of said at least one local subject.

73. The system of claim 70, wherein said at least one reconstructed local image is different than said at least one local region of said at least one local subject.

74. The system of claim 70, wherein said at least one reconstructed local image is at least one animation or at least one animated character.

75. The system of claim 70, wherein said at least one reconstructed local image is at least one inanimate object.

76. The system of claim 70, wherein said at least one reconstructed local image is at least one human or animal.

77. The system of claim 70, wherein said at least one reconstructed local image is at least one predetermined object.

78. The system of claim 77, wherein said at least one predetermined object is the same location as said at least one local region of said at least one local subject.

79. The system of claim 77, wherein said at least one predetermined object is a different location as said at least one local region of said at least one local subject.

80. The system of claim 70, wherein said at least one reconstructed local image is at least one local region of a different subject or a different said at least one local subject.

81. The system of claim 70, wherein said at least one local reconstructed image is a separate character.

82. The system of claim 70, reconstructing at least one local image is based on at least one of the following: artificial intelligence, expert systems, scripts, archives, data bases or some combination thereof.

83. The system of claim 70, wherein said at least one region of said at least one local subject comprises at least a portion of at least one of: face, eye, head, body, torso, limbs, or some combination thereof.

84. The system of claim 70, wherein said at least one region of said at least one local subject comprises at least one eye; and
wherein said at least one reconstructed local image based on said eye is adjusted to alter the apparent direction of said at least one reconstructed eye.

85. The system of claim 70, wherein said at least one region of said at least one local subject comprises at least a portion of said at least one local subject.

86. The system of claim 70, wherein said at least one region of said at least one local subject comprises the entirety of said at least one local subject.

87. The system of claim 70, wherein at least one of:
said at least one local model or said at least one remote model is a parameterized either statistically or arbitrarily, either manually or automatically.

88. The system of claim 70, wherein said at least one local or remote parameterized model comprises an Active Appearance Model (AAM) or Morphable Object Model, or some combination thereof.

89. The system of claim 88, further comprising:
using shape parameters, $p = (p_1,...,p_m)^T$ to generate the shape, s, of the AAM;
using appearance parameters $\lambda=(\lambda_1,...,\lambda_l;)$ to generate the AAM appearance image, A(x); and
warping A(x) from $s_0$ to the generated shape, s.

90. The system of claim 89, wherein said shape, s, of the AAM is provided by the formula:

$$S = S_0 + \sum_{i=1}^{m} si, pi. \quad (1)$$

91. The system of claim 90, wherein said generated AAM appearance image, A(x), is provided by the formula:

$$A_0(x) = A_0(x) + \sum_{i=1}^{l} \lambda_i A_i(x) \ \forall\, x \in s_0. \quad (2)$$

92. The system of claim 91, wherein the shape component, s, of an AAM is represented by n two-dimensional (2D) vertices, $s_0 = (x_1,y_1,...,x_n,y_n,)^T$, connected to form a triangulated mesh, to determine a set of basis shapes, $s_i$, that define the allowed variation in the shape, and wherein the coefficients $p_i$, are shape parameters that represent the shape, s.

93. The system of claim 92, wherein said appearance component, A(x), of said AAM is defined as an image, $A_0(x)$ formed of the pixels $x = (x, y)^T \in s_0$, and a set of basis images, $A_i(x)$, that define the allowed variation in the appearance, wherein:
$A_0(x)$ is the mean image and $A_i(x)$ are the (reshaped) eigenvectors corresponding to the l largest eigenvalues.

94. The system of claim 70, wherein said remote display means comprises at least one of the following:
monitor, panel, screen, printer, paper, projector, lap top, or any combination Thereof.

95. The system of claim 70, wherein said remote displaying occurs on at least one of the following modules: computers, televisions, projectors, PDAs, telephones, cellular telephones, satellite telephones, land vehicles, military vehicles, air craft, space craft, water crafts and ships, and land vehicles, lap top computers, notebook computers, net book computers, tablet computers, robots, processors or any combination thereof.

96. The system of claim 70, wherein the effect of changes to d as said at least one remote region of said remote subject moves is approximated as inversely proportional to the change in horizontal and vertical size of the user's face, as provided by the following formula:

$$d = d_0 * \frac{xSize_0}{xSize}$$

where xSize is the current width of said at least one region of said remote region, $d_0$ is the manually tuned approximate distance, and $xSize_0$ is the horizontal width of said at least one region of said remote region at the time of tuning.

97. The system of claim 70, wherein said local and remote obtaining data comprises:
capturing image or video data.

98. The system of claim 70, wherein said local and remote obtaining data comprises generating data from a computer model.

99. The system of claim 70, wherein said remote obtaining means comprises at least one of the following:
video system, video-conference system, camera, infrared camera, infrared video system, charge-coupled device (CCD), complementary-metal-oxide-semiconductor (CMOS), or any combination thereof.

100. The system of claim 70, wherein said local obtaining means comprises at least one of the following:
video system, video-conference system, camera, infrared camera, infrared video system, charge-coupled device (CCD), complementary-metal-oxide-semiconductor (CMOS), or any combination thereof.

101. The system of claim 70, wherein said image transmission system comprises at least one of the following transmission system types:
video-conference, television, closed-circuit television, internet, intranet, monitor, processor-to-processor, computer-to-computer, cellular telephones, telephonic, satellite, satellite telephones, hard wire, wireless, or some combination thereof.

102. The system of claim 70, wherein said local transmitting comprises:
transmission of said at least local region, including transmission of a single image or sequence of images, video, videoconferencing, computer animation, or any combination thereof.

103. The system of claim 70, wherein said local transmitting occurs to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

104. The system of claim 70, wherein said subject comprises a human, animal, animated or inanimate object; or some combination thereof.

105. The system of claim 70, further comprising:
a remote transmitting means for transmitting said extracted parameters of said at least one remote region to at least one local processor; and
a local reconstruction means for reconstructing at least one remote image based on said extracted parameters of said at least one remote region and said extracted parameters of said at least one local region.

106. The system of claim 105, wherein said at least one reconstructed remote image is the same as said at least one remote region of said at least one remote subject.

107. The system of claim 105, wherein said at least one reconstructed remote image is different than said at least one remote region of said at least one remote subject.

108. The system of claim 105, wherein said at least one reconstructed remote image is at least one animation or at least one animated character.

109. The system of claim 105, wherein said at least one reconstructed remote image is at least one inanimate object.

110. The system of claim 105, wherein said at least one reconstructed remote image is at least one human or animal.

111. The system of claim 105, wherein said at least one reconstructed remote image is at least one predetermined object.

112. The system of claim 111, wherein said at least one predetermined object is the same location as said at least one remote region of said at least one remote subject.

113. The system of claim 111, wherein said at least one predetermined object is a different location as said at least one remote region of said at least one remote subject.

114. The system of claim 105, wherein said at least one reconstructed remote image is at least one remote region of a different subject or a different said at least one remote subject.

115. The system of claim 105, wherein said at least one remote reconstructed image is a separate character.

116. The system of claim 105, reconstructing at least one remote image is based on at least one of the following: artificial intelligence, expert systems, scripts, archives, data bases or some combination thereof.

117. The system of claim 105, wherein said at least one region of said at least one remote subject comprises at least a portion of at least one of: face, eye, head, body, torso, limbs, or some combination thereof.

118. The system of claim 105, wherein said at least one region of said at least one remote subject comprises at least one eye; and
wherein said at least one reconstructed remote image based on said eye is adjusted to alter the apparent direction of said at least one reconstructed eye.

119. The system of claim 105, wherein said at least one region of said at least one remote subject comprises at least a portion of said at least one remote subject.

120. The system of claim 105, wherein said at least one region of said at least one remote subject comprises the entirety of said at least one remote subject.

121. The system of claim 105, further comprising:
a local display means for displaying said at least one reconstructed image of said at least one region of said at least one remote subject.

122. The system of claim 121, wherein said local display means comprises at least one of the following:
monitor, panel, screen, printer, paper, projector, lap top, or any combination Thereof.

123. The system of claim 121, wherein said local displaying occurs on at least one of the following modules: computers, televisions, projectors, PDAs, telephones, cellular telephones, satellite telephones, land vehicles, military vehicles, air craft, space craft, water crafts and ships, and land vehicles, lap top computers, notebook computers, net book computers, tablet computers, robots, processors or any combination thereof.

124. The system of claim 105, wherein said at least one reconstructed remote image is a view of the same remote region, rotated appropriately for the viewing angles of said at least one said local subject.

125. The system of claim 124, wherein said system comprises:
a local obtaining means for obtaining said data of at least one local subject;
wherein said viewing angles comprise horizontal viewing angles, $\theta$, and vertical viewing angles, $\phi$;
wherein said horizontal viewing angles, $\theta$, and vertical viewing angles, $\phi$, can be calculated from the overall displacement of said at least one region of said at least local subject along horizontal axes, x, and vertical axes, y, and the estimated distance from said local obtaining means, d, using the following formula:

$$\theta = \arcsin\frac{x}{d}$$
$$\phi = \arcsin\frac{y}{d}.$$

126. The system of claim 125, wherein the effect of changes to d as said at least one local region of said local subject moves is approximated as inversely proportional to the change in horizontal and vertical size of the user's face, as provided by the following formula:

$$d = d_0 * \frac{xSize_0}{xSize}$$

where xSize is the current width of said at least one region of said local region, $d_0$ is the manually tuned approximate distance, and $xSize_0$ is the horizontal width of said at least one region of said local region at the time of tuning.

127. The system of claim 105, wherein said remote and local obtaining data comprises:
capturing image or video data.

128. The system of claim 105, wherein said remote and local obtaining data comprises generating data from a computer model.

129. The system of claim 105, wherein said local obtaining means comprises at least one of the following:
video system, video-conference system, camera, charge-coupled device (CCD), complementary-metal-oxide-semiconductor (CMOS), or any combination thereof.

130. The system of claim 105, wherein said remote obtaining means comprises at least one of the following:
video system, video-conference system, camera, charge-coupled device (CCD), complementary-metal-oxide-semiconductor (CMOS), or any combination thereof.

131. The system of claim 105, wherein said image transmission system comprises at least one of the following transmission system types:
video-conference, television, closed-circuit television, internet, intranet, monitor, processor-to-processor, computer-to-computer, cellular telephones, telephonic, satellite, satellite telephones, hard wire, wireless, or some combination thereof.

132. The system of claim 105, wherein said remote transmitting comprises:
transmission of said at least remote region, including transmission of a single image or sequence of images, video, videoconferencing, computer animation, or any combination thereof.

133. The system of claim 105, wherein said remote transmitting occurs to at least one of the following modules: computers, televisions, projectors, PDAs, telephones, cellular telephones, satellite telephones, land vehicles, military vehicles, air craft, space craft, satellites, water crafts and ships, land vehicles, lap top computers, notebook computers, net book computers, tablet computers, robots, processors, buildings, factories, hospitals, residences, or any combination thereof.

134. The system of claim 105, wherein said subject comprises a human, animal, animated or inanimate object; or some combination thereof.

\* \* \* \* \*